US012617574B2

(12) United States Patent
Unkovic et al.

(10) Patent No.: US 12,617,574 B2
(45) Date of Patent: May 5, 2026

(54) CONTAINER CLASSIFICATION SYSTEM AND/OR METHOD

(71) Applicant: Chef Robotics, Inc., San Francisco, CA (US)

(72) Inventors: John Unkovic, San Francisco, CA (US); Rajat Bhageria, San Francisco, CA (US); Norberto A. Goussies, San Francisco, CA (US); Clement Creusot, San Francisco, CA (US); Somudro Gupta, San Francisco, CA (US); Tom Achache, San Francisco, CA (US); Luis Rayas, San Francisco, CA (US); Vinny Senthil, San Francisco, CA (US)

(73) Assignee: Chef Robotics, Inc., San Francisco, CA (US)

( * ) Notice: Subject to any disclaimer, the term of this patent is extended or adjusted under 35 U.S.C. 154(b) by 0 days.

(21) Appl. No.: 19/056,565

(22) Filed: Feb. 18, 2025

(65) Prior Publication Data

US 2025/0263189 A1     Aug. 21, 2025

Related U.S. Application Data

(60) Provisional application No. 63/639,454, filed on Apr. 26, 2024, provisional application No. 63/554,034, filed on Feb. 15, 2024.

(51) Int. Cl.
B65B 57/14 (2006.01)
B25J 9/16 (2006.01)
(Continued)

(52) U.S. Cl.
CPC ............. B65B 57/14 (2013.01); B25J 9/1682 (2013.01); B65B 35/16 (2013.01); B65B 35/24 (2013.01)

(58) Field of Classification Search
CPC ......... B65B 57/14; B65B 35/16; B65B 35/24; B65B 35/58; B65B 5/105; B65B 2210/02;
(Continued)

(56) References Cited

U.S. PATENT DOCUMENTS

2011/0166703 A1     7/2011  Byrne
2012/0043777 A1     2/2012  Maffeis
(Continued)

FOREIGN PATENT DOCUMENTS

JP          H1190871 A      4/1999
KR          102599468 B1    11/2023
WO          2023231735 A1   12/2023

OTHER PUBLICATIONS

Unkovic, et al., "Robotic End Effector System for Multiple Deposits", U.S. Appl. No. 19/186,481, filed Apr. 22, 2025.
(Continued)

*Primary Examiner* — Veronica Martin
(74) *Attorney, Agent, or Firm* — Jeffrey Schox; Evan Myers

(57) ABSTRACT

The method can include: determining image data; identifying a container using an object detector; and classifying a container state. The method can optionally include performing an action based on the container state classification. However, the method can additionally or alternatively include any other suitable elements. The method functions to detect and classify the state of bowls (i.e., complete/incomplete) to facilitate ingredient insertion into (unserved, 'incomplete') bowls along an assembly line.

22 Claims, 14 Drawing Sheets

(51) Int. Cl.
　　*B65B 35/16* 　　　　(2006.01)
　　*B65B 35/24* 　　　　(2006.01)

(58) Field of Classification Search
　　CPC ....... B65B 25/04; B65B 25/046; B65B 35/36;
　　　　　　　　B65B 43/46; B65B 5/045; B65B 5/08;
　　　　　　　B25J 9/1682; B25J 9/0093; B25J 9/0084;
　　　　　　　　B25J 9/1697; B25J 11/0045; B25J
　　　　　　　9/1664; B25J 9/1653; B25J 9/1661; B25J
　　　　　　　9/1669; B25J 21/00; B25J 9/161; B25J
　　　　　　　　　13/08; B25J 19/02; B25J 19/023
　　See application file for complete search history.

(56) References Cited

U.S. PATENT DOCUMENTS

| | | | | |
|---|---|---|---|---|
| 2017/0290345 | A1* | 10/2017 | Garden | .................... A21C 9/08 |
| 2018/0257219 | A1 | 9/2018 | Oleynik | |
| 2019/0291277 | A1 | 9/2019 | Oleynik | |
| 2020/0054175 | A1 | 2/2020 | Roy et al. | |
| 2020/0082522 | A1 | 3/2020 | Bonneau et al. | |
| 2020/0086485 | A1 | 3/2020 | Johnson et al. | |
| 2020/0090099 | A1 | 3/2020 | Johnson et al. | |
| 2020/0101617 | A1 | 4/2020 | Koike et al. | |
| 2020/0394603 | A1 | 12/2020 | Ottitsch et al. | |
| 2021/0299706 | A1 | 9/2021 | Filler et al. | |
| 2021/0400993 | A1 | 12/2021 | Hare | |
| 2022/0033123 | A1* | 2/2022 | Zheng | ..................... B65B 55/20 |
| 2022/0048707 | A1 | 2/2022 | Matl et al. | |
| 2022/0227005 | A1* | 7/2022 | Sakai | ..................... B65B 57/14 |
| 2022/0346598 | A1 | 11/2022 | Sinnet et al. | |
| 2022/0348409 | A1 | 11/2022 | Sun et al. | |
| 2023/0039524 | A1 | 2/2023 | Bhageria et al. | |
| 2023/0159285 | A1 | 5/2023 | Catelli et al. | |
| 2023/0191615 | A1 | 6/2023 | Creusot et al. | |
| 2023/0303342 | A1* | 9/2023 | Kulkarni | ................... B07C 5/36 |
| 2023/0390941 | A1 | 12/2023 | Opoku et al. | |

OTHER PUBLICATIONS

"EMI Engineers are here to assist you with all aspects of your part handling EOAT", EMI, EOAT Solutions, EOAT Engineering, https://www.emicorp.com/eoat-engineering, first downloaded Jan. 23, 2025.
Goussies, et al., "System and/or Method for Conveyor Motions Estimation", U.S. Appl. No. 18/499,092, filed Oct. 31, 2023.

* cited by examiner

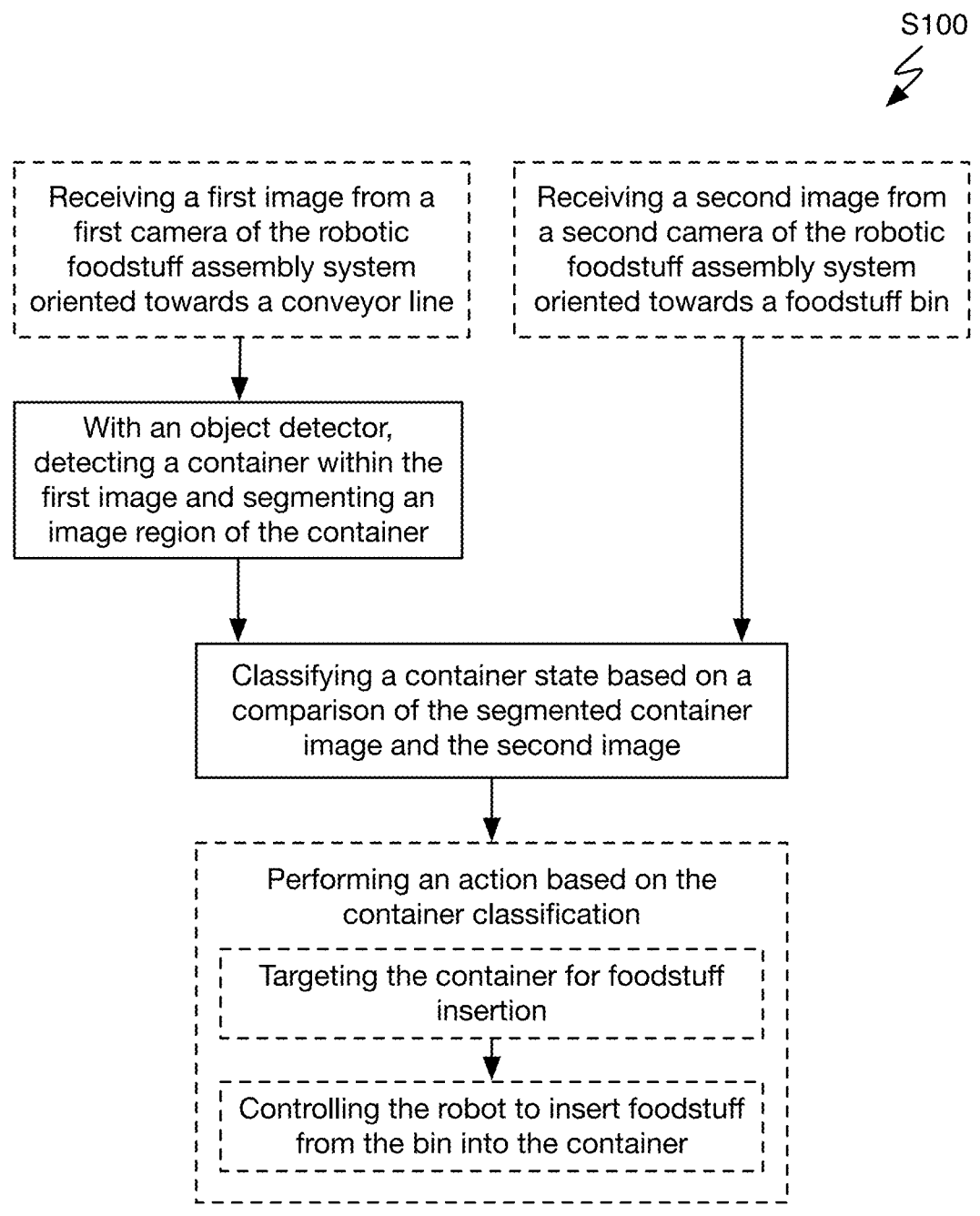

S100

Receiving a first image from a first camera of the robotic foodstuff assembly system oriented towards a conveyor line Receiving a second image from a second camera of the robotic foodstuff assembly system oriented towards a foodstuff bin With an object detector, detecting a container within the first image and segmenting an image region of the container Classifying a container state based on a comparison of the segmented container image and the second image Performing an action based on the container classification Targeting the container for foodstuff insertion Controlling the robot to insert foodstuff from the bin into the container

FIGURE 8 bin images          segmented bowl images striped belt

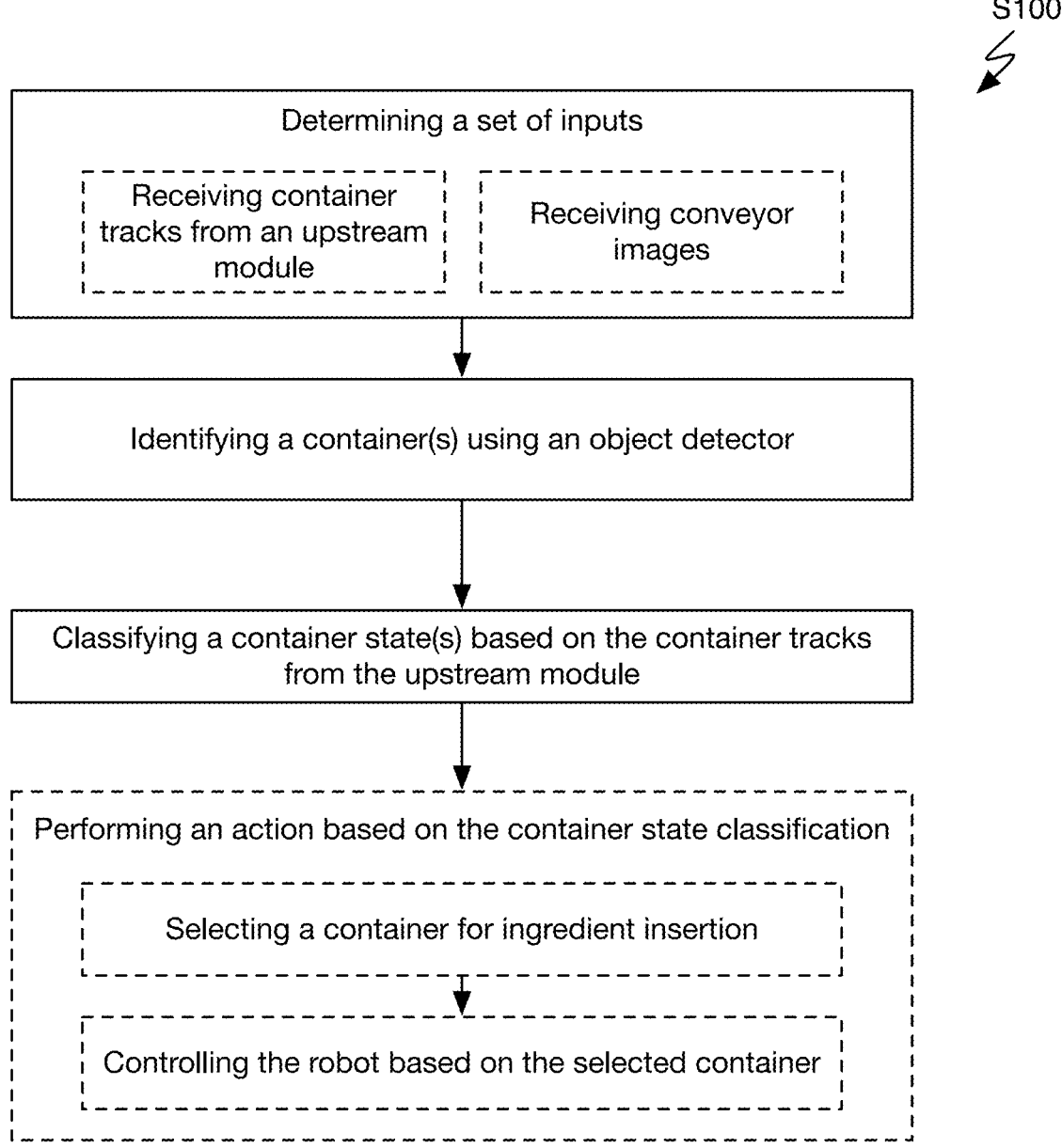

S100

Determining a set of inputs

Receiving container tracks from an upstream module

Receiving conveyor images

Identifying a container(s) using an object detector

Classifying a container state(s) based on the container tracks from the upstream module Performing an action based on the container state classification Selecting a container for ingredient insertion Controlling the robot based on the selected container

FIGURE 12

CONTAINER CLASSIFICATION SYSTEM AND/OR METHOD

CROSS REFERENCE TO RELATED APPLICATIONS

This application claims the benefit of U.S. Provisional Application No. 63/639,454, filed 26-APR-2024, and U.S. Provisional Application No. 63/554,034, filed 15 Feb. 2024, each of which is incorporated herein in its entirety by this reference. This application is related to U.S. application Ser. No. 18/075,961, filed 6 Dec. 2022, which is incorporated herein in its entirety by this reference.

TECHNICAL FIELD

This invention relates generally to the robotic automation field, and more specifically to a new and useful classification system and/or method in the robotic automation field.

BRIEF DESCRIPTION OF THE FIGURES

FIG. 8 is a flowchart diagram representation of a variant of the method.

FIG. 12 is a flowchart diagram representation of a variant of the method.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 2:
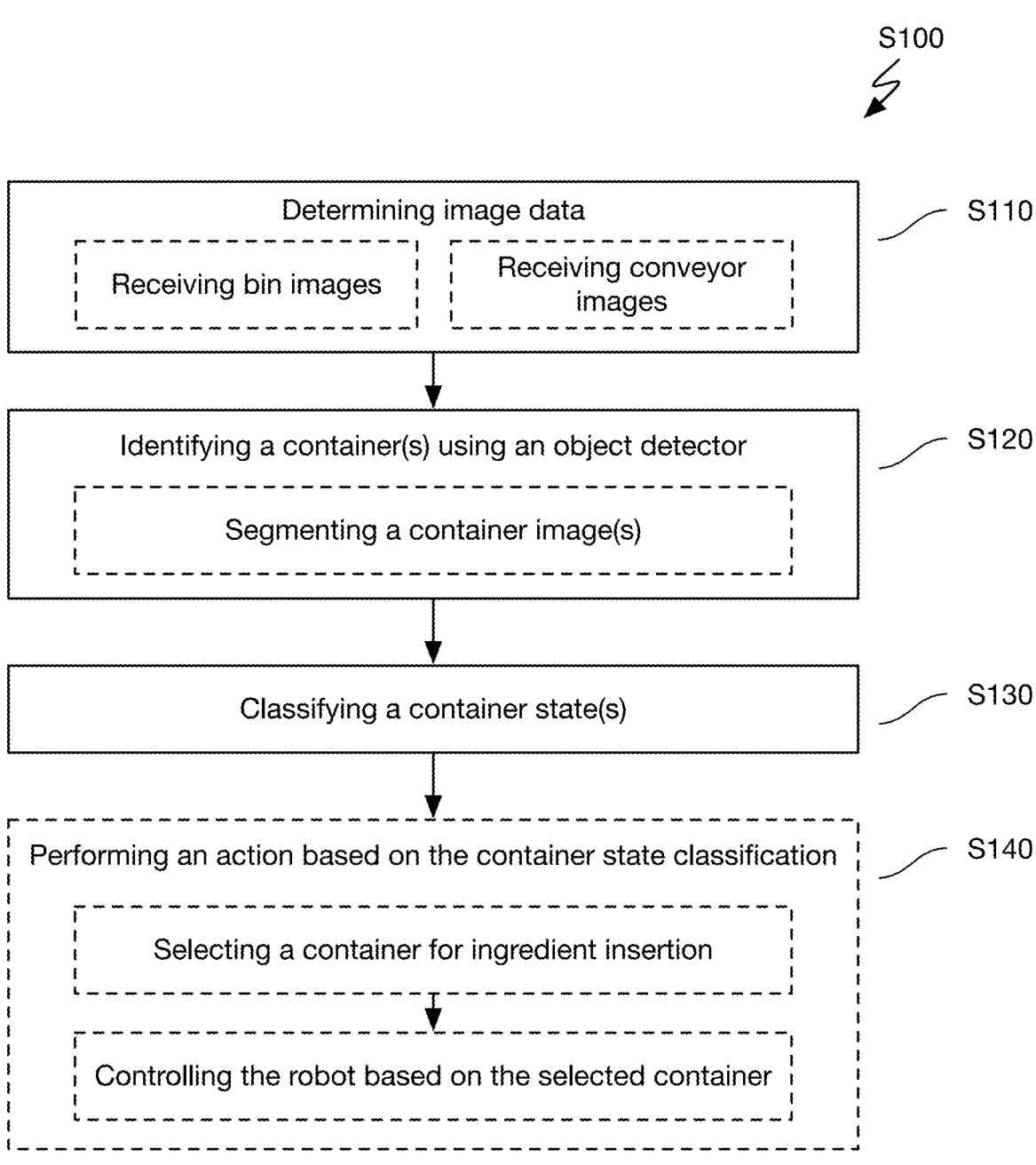
FIG. 2 is a flowchart diagram representation of a variant of the method.
Figure 13:
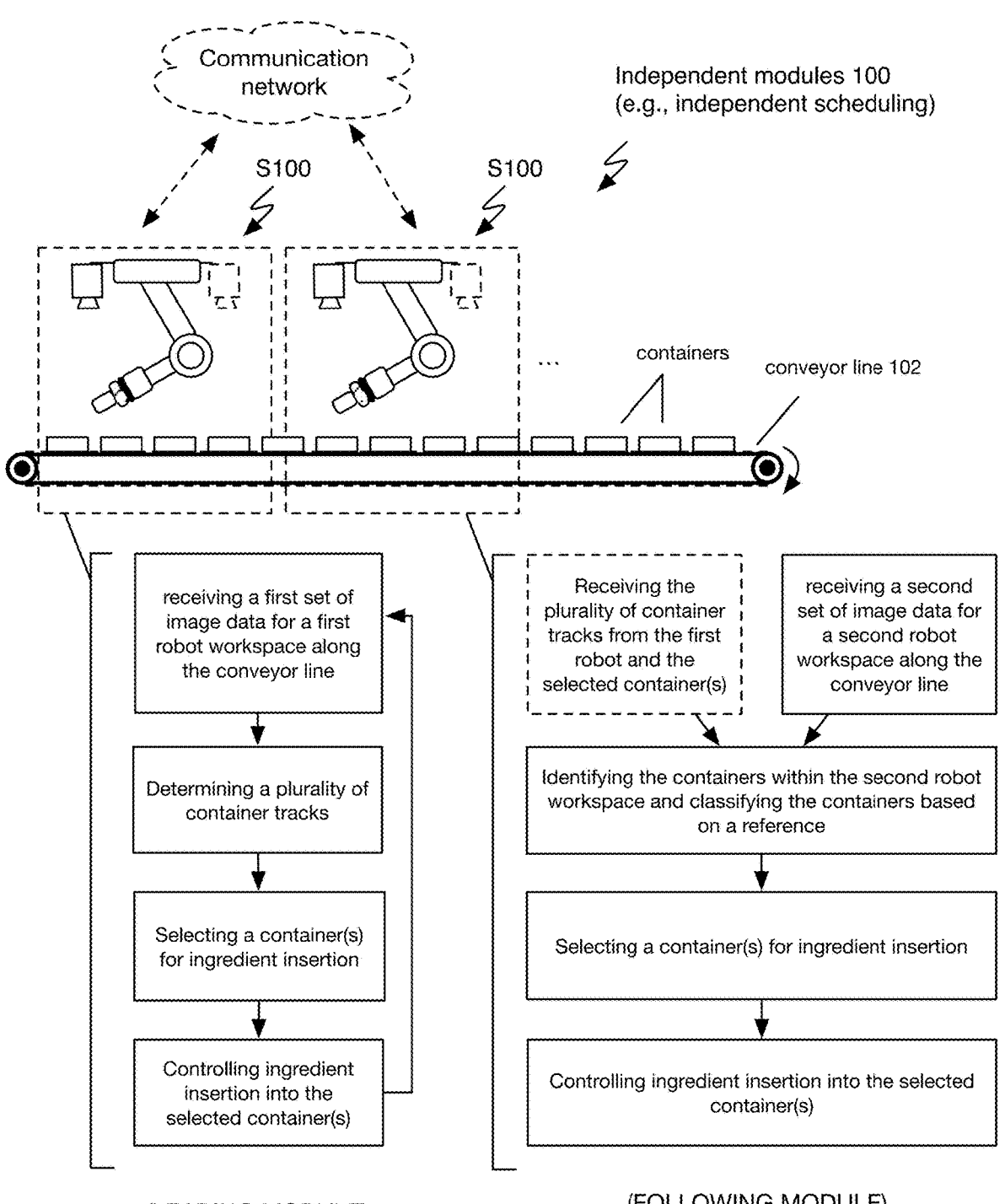
FIG. 13 is a schematic representation of a variant of the system and/or method.

The method S100, an example of which is shown in FIG. 2, can include: determining image data S110; identifying a container using an object detector S120; and classifying a container state S130. The method can optionally include performing an action based on the container state classification S140. However, the method S100 can additionally or alternatively include any other suitable elements. The method functions to detect and classify the state of bowls (i.e., complete/incomplete) to facilitate ingredient insertion into (unserved, 'incomplete') bowls along an assembly line. Examples of the method S100 are shown in FIGS. 12 and 13.

Additionally, container classification can include or be used to facilitate dynamic insertion scheduling and/or real time cooperation of multiple, independent robots operating along an assembly line, such as in conjunction with the system(s) and/or method elements as described in U.S. application Ser. No. 18/075,961, filed 6 Dec. 2022, which is incorporated herein in its entirety by this reference.

Variants of the method can additionally include and/or operate in conjunction with the any of the classification and/or labeling method elements as described in U.S. application Ser. No. 18/379,127, filed 11 Oct. 2023, which is incorporated herein in its entirety by this reference.

Variants can be used can be used in conjunction with any of the method elements and/or processes as described in U.S. application Ser. No. 18/499,092, filed 31 Oct. 2023, which is incorporated herein in its entirety by this reference.

The term "bowl" as utilized herein can additionally or alternatively refer to containers (e.g., food container), trays (e.g., food trays, microwave trays, etc.), base food items (e.g., tortilla, bread, dough, etc.; such as for burritos, wraps, sandwiches, pizzas, etc.), fruit cups, party trays, bins, and/or any other suitable bowls or other object(s), such as objects in a (conveyor) line assembly context. For instance, the terms "bowl detector" (and/or "bowl detection model") can likewise reference a container detector, container detection model, and/or any other suitable object detection model(s). Similarly, the term "bowl classifier" (and/or "bowl classification model") can likewise reference a container classifier, container classification model, and/or any other suitable object classification model(s). However, the term "bowl" can be otherwise suitably referenced herein. Additionally, it is understood that, in some variants, bowl detection/classification approaches herein may be generalized to any other suitable object detection problems and/or assembly contexts. For instance, variants can additionally or alternatively be used for detection and classification of the self-contained foods (i.e., food-based containers/bowls), such as bread-bowls, wraps, burritos, pizzas, and/or any other suitable self-contained food assemblies, and/or in any other suitable food-based or other detection contexts.

Additionally, containers can include a single food cavity/compartment (e.g., basin of a bowl), multiple food cavities/compartments, and/or can be otherwise configured. In such variants, food compartments can be labeled/classified collectively (e.g., as a single container) and/or individually (e.g., each classified as complete/incomplete, served/unserved, to be served or not served, etc.).

Variants of the system and/or method can be used in conjunction with a single lane conveyor and/or multi-lane conveyor. For instance, variants can facilitate detection and/or ingredient insertion into containers on a single-lane conveyor, a specific (e.g., predefined or dynamically selected) lane of a multi-lane conveyor, and/or multiple lanes of a multi-lane conveyor. Additionally, variants of the system and/or method can be configured to operate foodstuff assembly robots in high-throughput line settings and/or can facilitate task-agnostic (i.e., ingredient agnostic) operation along a conveyor line based on real-time edge compute, even when the throughput rate of the line exceeds the throughput capacity of the robot.

Variants of the system and/or method can facilitate classification of container states (i.e., 'to be served'; 'not to be served; 'served'; 'unserved'; completeness, etc.) based on images of the (bulk) ingredients to be served. In a first example, container state classifications may be based on a similarity comparison between an image of the container and an image(s) of the bulk ingredients to be served (e.g., an image of the foodstuff bin[s]). In a second example, container state classifications can be based on derived parameters and/or coordinated tracking between modules along a conveyor line. Such variants can enable classification of containers/bowls using a generalized model (e.g., not specific to a particular ingredient or set of ingredients), which may be agnostic to the type/appearance of ingredient and/or may enable container state classifications for new ingredients, recipes, and/or skews (e.g., not present in training data; never before observed; relying on the hotel pan image[s] as a reference; etc.). Additionally, variants can utilize predetermined and/or dynamically determined conveyor settings/configurations (e.g., conveyor speed; visual appearance patterns of the conveyor, etc.) and/or insertion schemes (e.g., pattern-based insertion planning) to improve classification accuracy (e.g., at an individual system and/or globally). Additionally or alternatively, variants can dynamically adjust and/or control the conveyor speed responsive to ingredient insertion (e.g., via wireless network, etc.).

For instance, variants can receive a signal from stop-and-go conveyor directing ingredient insertion (e.g., where ingredient deposition occurs responsive to the signal and/or where the conveyor is controlled in response to a control signal from the computing system, after ingredient deposition). As an example, control loop-closure (e.g., for stop-and-go conveyors) can reduce dwell time, thus increasing net throughput. Additionally or alternatively, in some variants the computing system can be communicatively coupled to a conveyor controller such that the system can directly read and/or control the speed setpoint of a continuous conveyor. For example, controlling the speed setpoint at a downstream, following robot can may reduce and/or completely eliminate missed bowls (e.g., while increasing net throughput).

Additionally or alternatively, variants of the system and/or method can enable robotic insertion of ingredients with modules which may be electrically and/or communicatively decoupled from a conveyor line controller and/or each other. For example, sensing, planning, and control may be decentralized (e.g., performed independently at each module; edge sensing, planning, and/or compute). Such variants can improve the reconfigurability and/or serviceability of modules along a conveyor line and/or may decrease the burden of integrating such systems. Alternatively, variants can supplement and/or operate in conjunction with communicatively coupled modules (e.g., to improve accuracy, facilitate operation when communication is interrupted, etc.), and/or can be otherwise configured. For example, robots can be configured to operate in a pairwise arrangement, with one 'lead' module communicating which bowls have been served to a 'following' module (e.g., via 1D SLAM, relative to intrinsic references, extrinsic references, fiducials, etc.). Additionally or alternatively, variants can be communicatively coupled to the conveyor line and/or configured to control the conveyor line (e.g., stop-and-go conveyor; dynamically adjust speed responsive to insertion, etc.).

Variants can utilize robust computer vision, object detection, and similarity classification techniques (e.g., neural networks, YOLO object detectors, Siamese networks, etc.) to facilitate container identification and/or classification which can be agnostic to variability in robot arrangement and/or workspace configurations. Variants can be agnostic to a variety of lighting conditions, container geometries (e.g., square bowls, round bowls, oblong bowls, plates, burritos; containers of arbitrary size and shape; etc.), conveyor line configurations (e.g., color, width, height, number of lanes; conveyors with guards for container alignment; indexed conveyors, continuous conveyors, stop-and-go conveyors, etc.), container arrangement/orientation, ingredient type, serving size/amounts of each ingredient, relative arrangement of modules/container, and/or other variability. However, the system(s) and/or method(s) described herein can be otherwise configured.

The term "substantially" as utilized herein can mean: exactly, approximately, within a predetermined threshold or tolerance, and/or have any other suitable meaning.

2. Variants

In one set of variants (e.g., an example is shown in FIG. 8), a method can include: receiving a first image from a first camera of the robotic foodstuff assembly system oriented towards a conveyor line; receiving a second image from a second camera of the robotic foodstuff assembly system oriented towards a foodstuff bin; with an object detector, detecting a container within the first image and segmenting an image region of the container; classifying a container state based on a comparison of the segmented container image and the second image; and performing an action based on the container classification (e.g., targeting the container for foodstuff insertion and/or controlling the robot to insert foodstuff from the bin into the container).

In a first variant, foodstuff assembly modules can be coordinated via inter-module communication (i.e., communication-based coordination). In a first example, foodstuff assembly modules can be coordinated using a common external reference system and/or coordinate frame (e.g., belt features such as stripes or fiducials; calibrated common coordinate system, etc.). In a second example, foodstuff assembly modules can be coordinated using derived references (e.g., comparison of observations, such as detected spacing of bowls, lateral position/orientation of bowls, appearance of bowls, etc.).

In a second variant, nonexclusive with the first, foodstuff assembly modules can independently classify bowls based on ingredient similarity (e.g., to facilitate coordination in absence of inter-module communication, such as when communication is interrupted, and/or when drift is detected; to facilitate entirely independent operation).

In one set of variants, a method for pairwise control of a first foodstuff assembly robot and a second foodstuff assembly robot along a conveyor line, the method comprising: based on a first image of a first robot workspace of the first foodstuff assembly robot, determining a plurality of container tracks for a plurality of containers within the first robot workspace; based on the plurality of container tracks, controlling the first foodstuff assembly robot to perform foodstuff insertion into a first subset of the plurality of containers; subsequently, based on a second image of a second robot workspace of the second foodstuff assembly robot, identifying a remainder of the plurality of containers within the second robot workspace, wherein the first robot workspace and the second robot workspace are non-overlapping; and controlling the second foodstuff assembly robot to perform foodstuff insertion into the remainder of the plurality of containers.

In a first variant, the remainder of the plurality of containers are identified based on the plurality of container tracks. For example, the remainder of the plurality of containers are identified by a computing system of the second foodstuff assembly robot, wherein the method further comprises: prior to capturing the second image, receiving the plurality of tracks at the computing system of the second foodstuff assembly robot. In a second example the first and second foodstuff assembly robots are communicatively coupled via a wireless mesh network.

In a second variant, the method further comprises, at the second foodstuff assembly robot: classifying each container of the plurality of containers based on the foodstuff insertion performed by the first foodstuff assembly robot, wherein the remainder of the plurality of containers is identified based on the respective classification of each container; and tracking the remainder of the plurality of containers within the second robot workspace. For example, each container is classified using an extrinsic reference (e.g., a set of indicators along the conveyor line). As a second example, each container is classified using an intrinsic reference associated with the container, wherein the intrinsic reference is independent of foodstuff within the container. As a third example, each container is classified using an image comparison (e.g., PBSM). As a fourth example, the method can comprise: at the first foodstuff assembly robot, estimating a speed of the conveyor line, wherein the first subset of the plurality of containers are selected according to a first predetermined insertion strategy based on the speed of the conveyor line. For example, the second foodstuff assembly robot is controlled to perform foodstuff insertion into the remainder of the plurality of containers according to a second predetermined insertion strategy, wherein the second predetermined insertion strategy is different from the first predetermined insertion strategy.

In a third variant, the first subset of the plurality of containers are selected according to a first predetermined insertion strategy, wherein a speed of the conveyor line is controlled based on the first predetermined insertion strategy.

In a fourth variant, the method further comprises: at the second foodstuff assembly robot, calibrating an offset distance between first and second robot workspaces based on a relative spacing between the plurality of containers. For example, the offset distance is determined by Simultaneous Localization and Mapping (SLAM) along the conveyor (e.g., wherein the offset distance is less than twice the dimension of the first robot workspace along the length of the conveyor line). As a second example, the offset distance is calibrated responsive to a manual pairing of the first and second foodstuff assembly robots.

In variants, the method can optionally include: controlling the conveyor line based on the foodstuff insertion performed at the first foodstuff assembly robot.

However, the method can include any other suitable elements.

3. System

Figure 1:
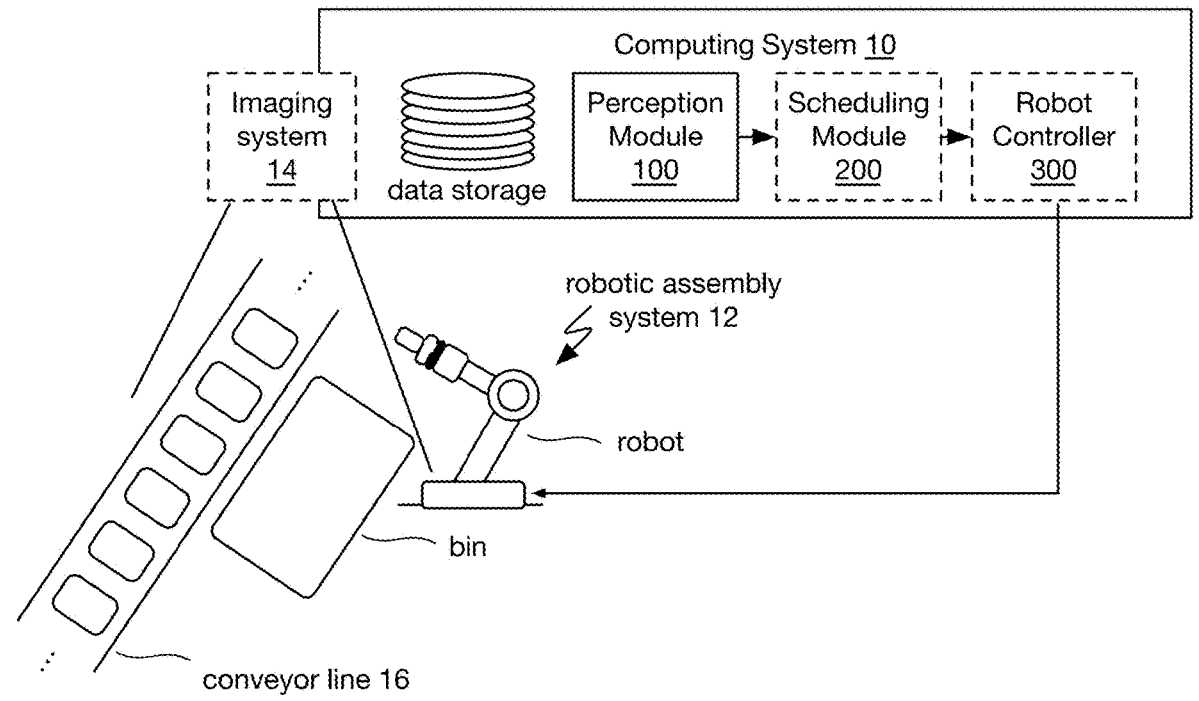
FIG. 1 is a schematic representation of a variant of the system.
Figure 5:
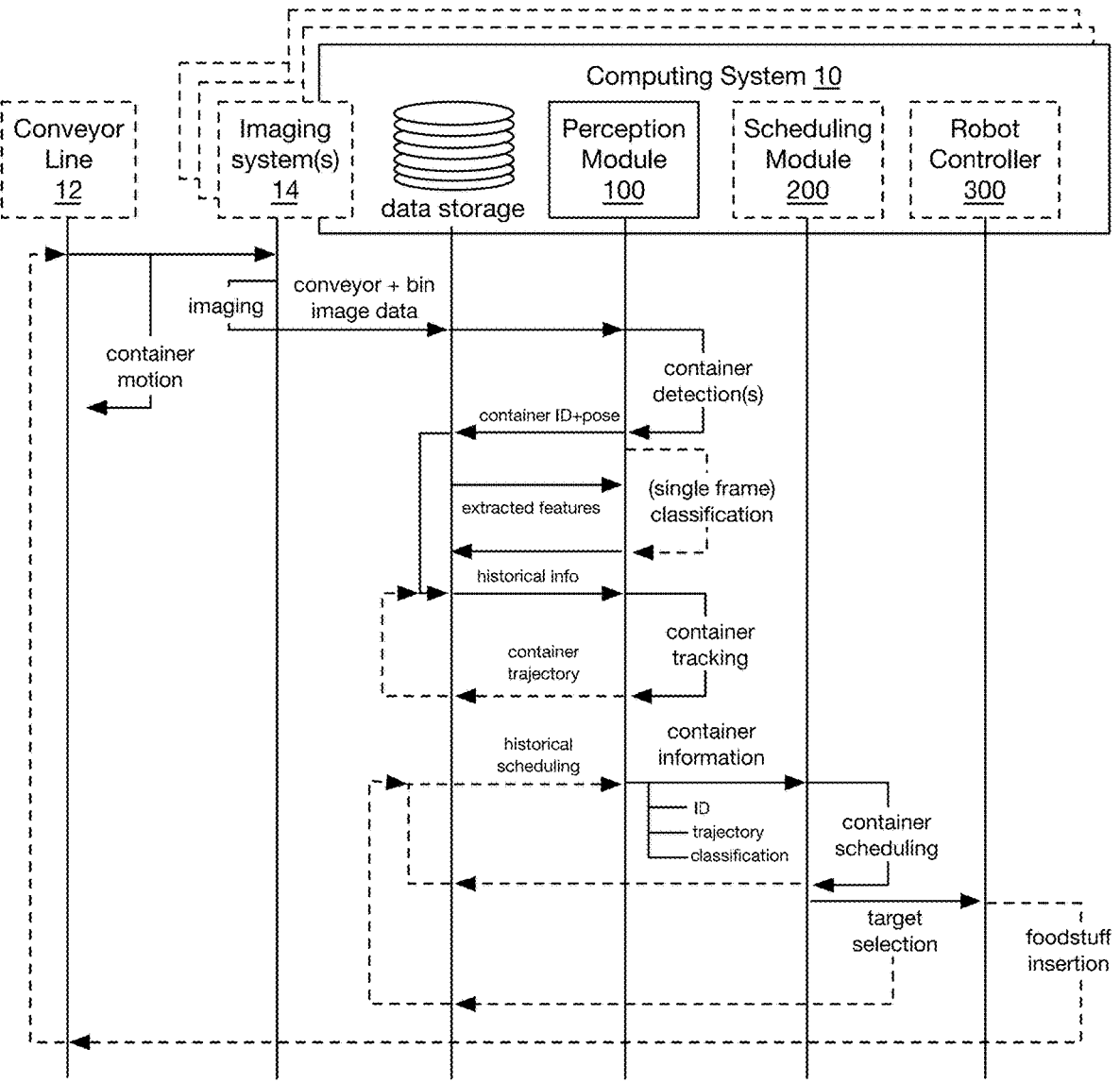
FIG. 5 is a flowchart diagram representation of a variant of the method and/or system.
Figure 6:
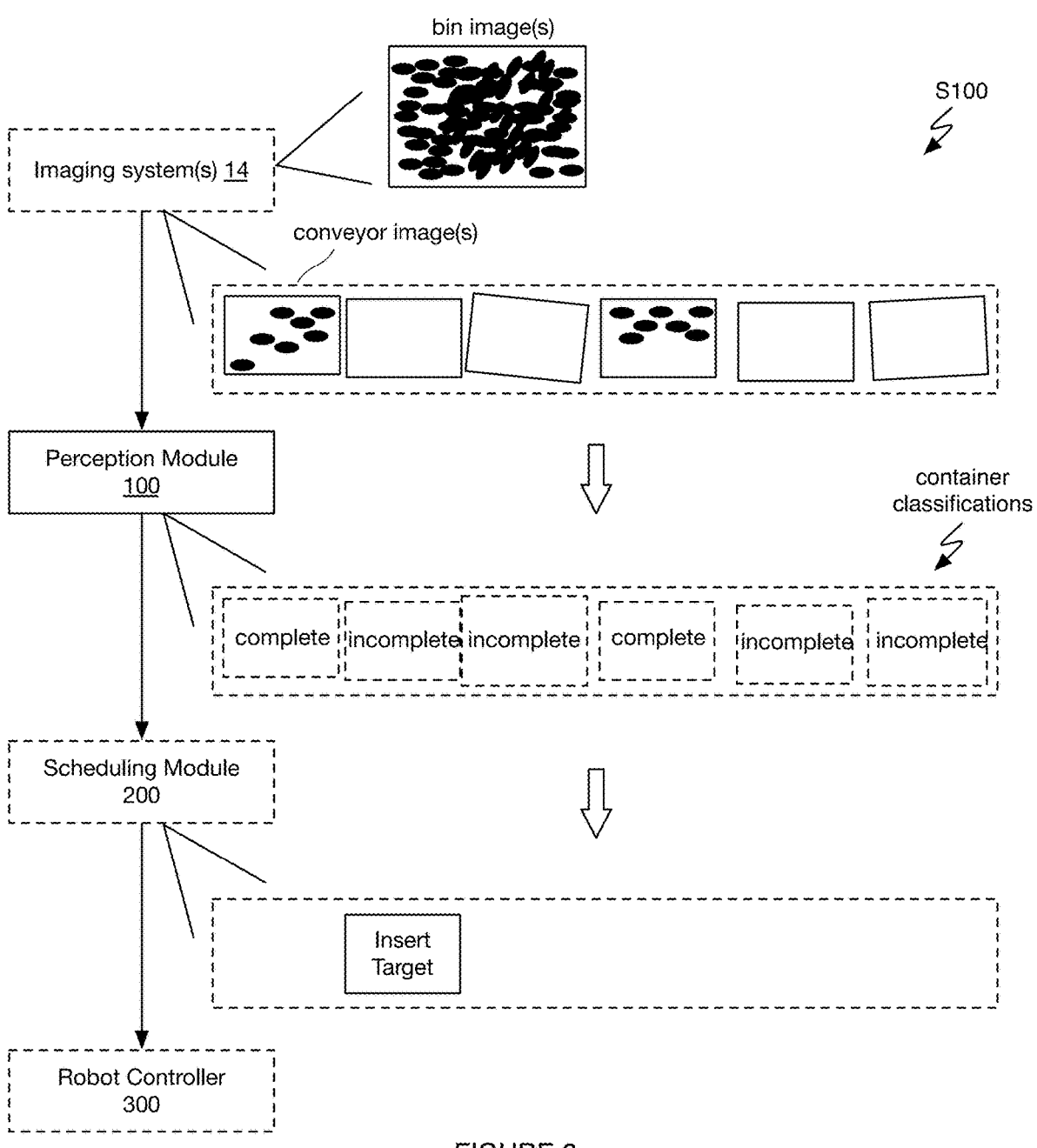
FIG. 6 is an example illustration of container classification in a variant of the method.

The system, an example of which is shown in FIG. 1, can include a computing system 10, a robot assembly system 12, an imaging system 14, and an optional conveyor line 16. The computing system 10 (e.g., an example is shown in FIG. 5) can include: a perception module 100, an optional scheduling module 200, and an optional robot controller 300, and/or any other suitable computing module/elements. However, the system can additionally or alternatively include any other suitable set of components. The system functions to facilitate execution of method S100. Additionally or alternatively, the system can function to facilitate runtime classifications of bowls along an assembly line to facilitate robotic ingredient insertion, such as with the system and/or method(s) described in U.S. application Ser. No. 17/881, 475, filed 4 Aug. 2022, which is incorporated herein in its entirety by this reference.

In some variants, the system can optionally include or be used with a robotic assembly system 12, such as a robotic pick and place system, gantry-style dispensing system, multi-axis robotic arm, and/or other robotic assembly system. In one variant, the system can include or be used in conjunction with the robotic foodstuff assembly system as described in U.S. application Ser. No. 17/881,475, filed 4 Aug. 2022, which is incorporated herein in its entirety by this reference.

The system can optionally include or be used in conjunction with an industrial conveyor line 16 or deployed in a high-throughput assembly application (e.g., airline food catering prep, etc.; continuously moving line; where a container throughput rate exceeds an insertion throughput rate of a robotic assembly module by a factor of: 1.5,2, 3, 4, greater than 4, any range bounded by the aforementioned values, and/or any other suitable line speed, etc.), such as in place of a human line worker. In a specific example, the system and/or workspace thereof can be downstream of a human assembly workspace along the conveyor line. In a second example, a cyclic insertion of the foodstuff ingredient by the system and/or method can define an (ingredient) insertion rate, wherein a container throughput rate of the conveyor line is greater than the insertion rate (e.g., between 100% and 200% of the insertion rate, exactly 200% of the insertion rate, greater than 200% of the insertion rate, etc.). However, the system can alternatively be deployed in any suitable robotic assembly settings.

Figure 7A:
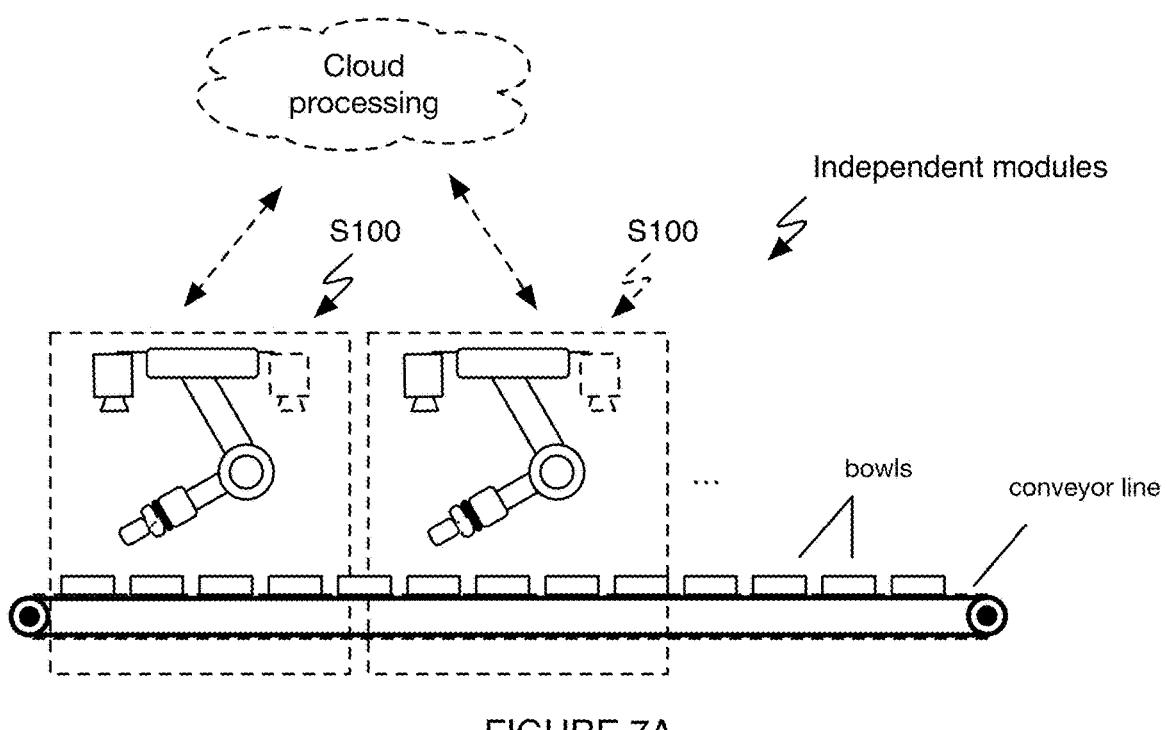
FIGS. 7A-7B are schematic representations of a first and a second variant of the system, respectively.

In variants, multiple independent (e.g., modular) instances of the system and/or method can cooperatively operate and/or coordinate without requiring cross communication (e.g., between modules), cross calibration (e.g., calibrate the relative arrangement and/or offset between leading/following modules relative to the conveyor), and/or centralized control (e.g., at a central compute node coordinating between modules). In a specific example, a plurality of robotic assembly modules arranged along a single conveyor line may operate in absence of communication with each other and/or a central controller during planning and/or ingredient insertion (e.g., during an insertion interval; an example is shown in FIG. 7A). Additionally or alternatively, modular instances can communicate object tracking information (e.g., detections+object tracks) and/or object classifications (e.g., 'completed' bowls), such as to facilitate downstream object classifications/planning based on a priori control and/or tracking. In a second example, each robotic assembly module can be controlled independently of a conveyor line and/or while communicatively decoupled from the conveyor line. For instance, in absence of communication with a conveyor line controller, the system 100 can detect and/or track containers on the conveyor line and respond accordingly (e.g., dynamically adjusting current/future scheduling, planning, and control based on the motion of the conveyor; based on the container state[s]). As an example, two robots arranged in series along a conveyor line may each insert a particular ingredient (e.g., rice) into containers moving along the conveyor line, with each robot inserting ingredients into a fraction of the containers. The first robot may place ingredients into (a.k.a., 'serve') about half the containers (e.g., alternating insertions; every other container; at an irregular cadence), more than half the containers (e.g., at an irregular cadence), or some other arbitrary selection(s) of containers. To cooperate with the first robot and avoid inserting into a bowl that has already been served, the second robot (and/or both robots) may classify the state of each container moving along the line as 'served' or 'unserved,' and perform insertion planning based on the container state classifications (e.g., based on a priori object tracks/classifications from the first robot; in absence of a priori data).

Additionally or alternatively, variants can be directly or indirectly communicatively coupled with a conveyor line controller to dynamically coordinate ingredient insertion (e.g., responsive to conveyor dwell in an indexed, stop-and-go conveyor) and/or conveyor motion (e.g., to control throughput and/or prevent missed bowls). For example, the modules can be configured to read the conveyor speed, set the conveyor speed, and/or dynamically control the conveyor speed as may be advantageous in various contexts. As an example, control loop-closure (e.g., for stop-and-go conveyors) can reduce dwell time, thus increasing net throughput. Additionally or alternatively, in some variants the computing system can be communicatively coupled to a conveyor controller such that the system can directly read and/or control the speed setpoint of a continuous conveyor. For example, controlling the speed setpoint at a downstream, following robot can may reduce and/or completely eliminate missed bowls (e.g., while increasing net throughput).

The imaging system 14 functions to capture images of objects (e.g., food containers) within a workspace of the system, such as a workspace along a conveyor line. Additionally or alternatively, the imaging system can function to provide imaging data to the object detector in accordance with Block S110 of the method. Additionally or alternatively, the imaging system can provide images which can be (auto-) labeled and used for training of the classification system in accordance with method Block S200. The imaging system can include: conveyor line cameras (e.g., integrated into the conveyor line and/or arranged adjacent to the conveyor line; oriented toward bowls and/or a workspace along the conveyor line). The imaging system preferably includes 2D RGB cameras, depth imaging cameras, stereo camera pairs, CCD cameras, CMOS cameras, multispectral cameras, time-of-flight sensors (e.g., Lidar scanner, etc.), range imaging sensors (e.g., stereo triangulation, sheet of light triangulation, structured light scanner, time-of-flight, interferometry, etc.), and/or any other suitable sensors. In variants, the imaging system can collect sensor data which can include: RGB images (e.g., 2D), depth images (e.g., pixel aligned with the RGB, wherein the RGB image and the depth image can be captured by the same or different sensor sets), 3D imaging data, 3D representations (e.g., point cloud, 3D model, etc.). In variants, the imaging system can determine a first set of 3D sensor data—which can be used for bowl detection during S120—and a second set of 2D sensor data (e.g., RGB data and/or RGB-d data)—which can be classified (e.g., in accordance with S130) and used to facilitate actions and/or robotic insertion in accordance with Block S140. Additionally or alternatively, 2D sensor data generated by the imaging system can be used for object classification and insertion planning during runtime operation.

Within the (each) foodstuff assembly module, imaging sensors are preferably calibrated within a common coordinate frame (i.e., sensor coordinate frame calibrated to a relative arrangement of the conveyor line and the robotic assembly module) in a fixed/predetermined arrangement relative to a (joint) coordinate frame of the respective robot assembly module, but can be otherwise suitably configured. For example, imaging sensors can be registered to a particular machine configuration and/or environmental setting (e.g., live/in-situ registration), such as by the process(es) described in U.S. application Ser. No. 17/881,475, filed 4 Aug. 2022, which is incorporated herein in its entirety by this reference. Additionally or alternatively, imaging sensors can be globally calibrated (e.g., across modules, where the relationship is predetermined in a global coordinate frame) and/or can be otherwise configured.

However, the system can alternatively include or be used in conjunction with any other suitable imaging system(s); or the system can altogether exclude an imaging system.

The computing system 10 functions to facilitate bowl classification and/or ingredient insertion based on bowl classifications (i.e., into 'incomplete', bowls which have not been served the ingredient within the foodstuff bin). Additionally or alternatively, the computing system can function to perform various method elements and/or subprocesses of method S100. The computing system and/or processing modules thereof can be centralized, distributed, local (e.g., onboard a robotic assembly module; edge computing; etc.), remote (e.g., include remote processors offboard a robotic assembly system 12 and/or cloud processing elements), and/or include any other suitable processing elements/modules.

Figure 3:
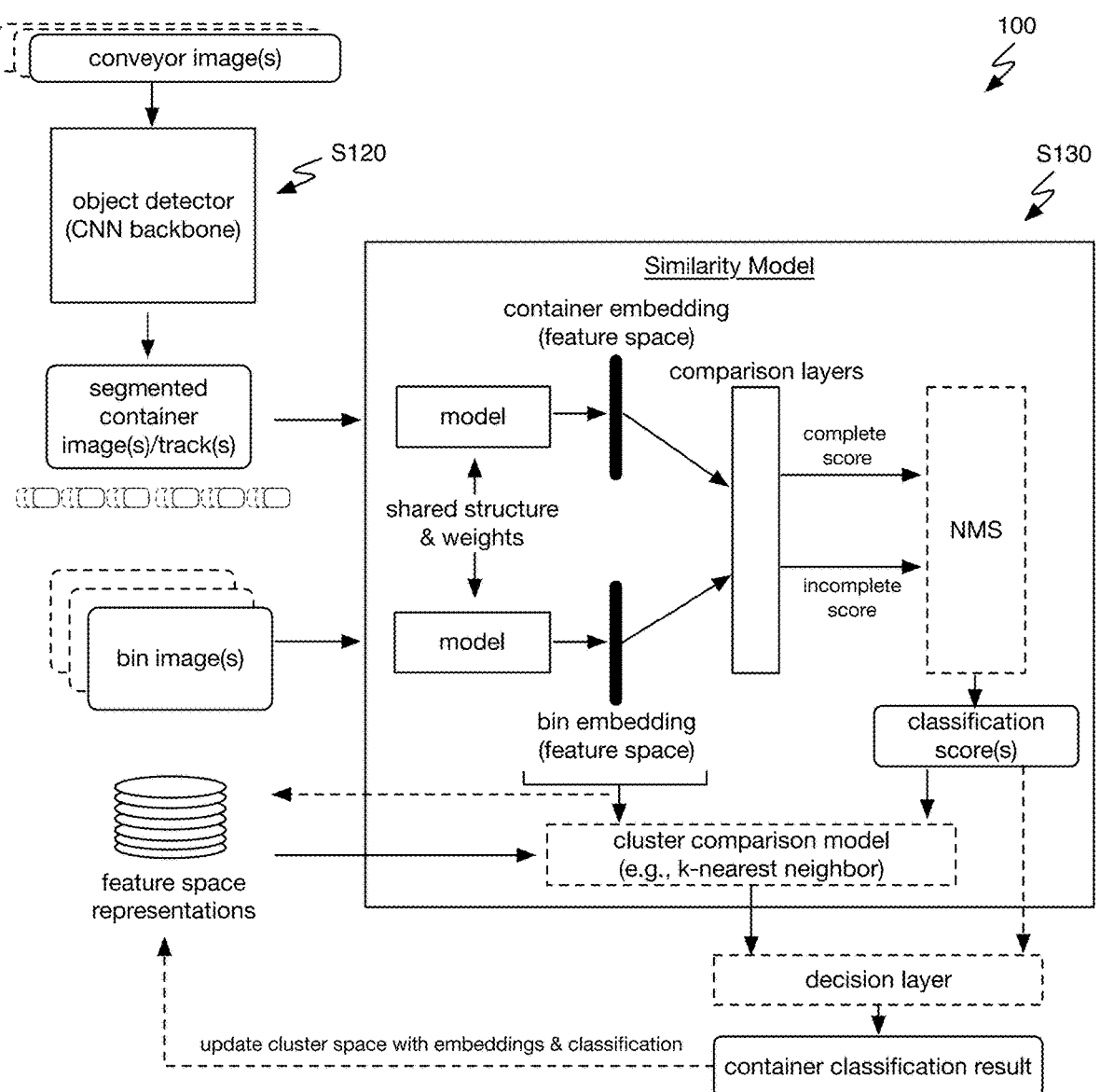
FIG. 3 is a schematic representation of a variant of the system.
Figure 4:
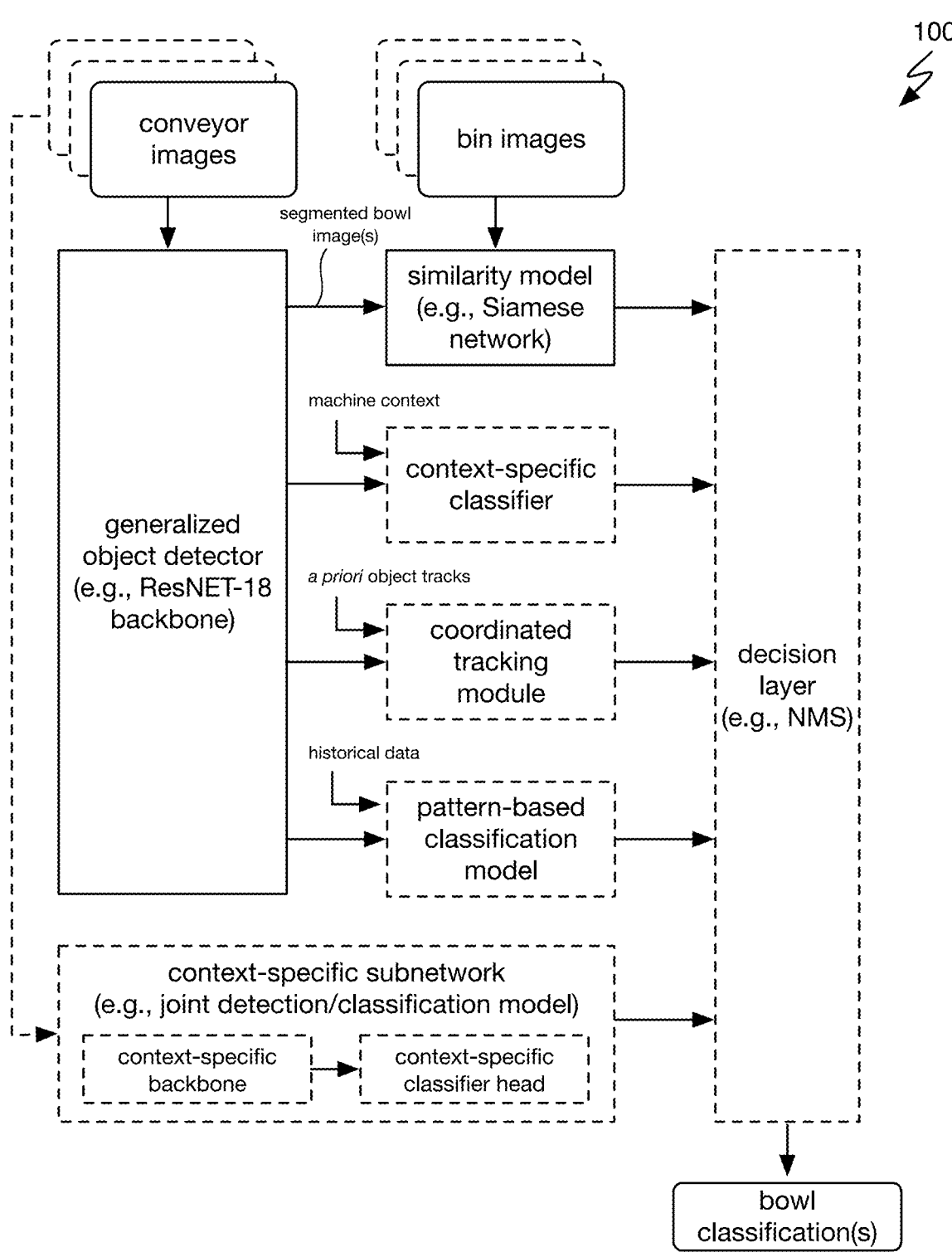
FIG. 4 is a schematic representation of a variant of the system.

The computing system and/or perception module 100 thereof can include and/or execute a set of models, which functions to facilitate method S100. The set of models can include an object detector (a.k.a., bowl detector), a similarity model, and/or any other suitable model(s). The set of models can optionally include a context-specific classification model, a pattern-based classification model, a context-specific subnetwork, a decision layer, and/or any other suitable elements. Additionally or alternatively, the set of models can include or be used in conjunction with a coordinated tracking module and/or a model(s)/elements thereof (e.g., Simultaneous Localization and Mapping [SLAM] algorithm, Extended Kalman filter [EKF], covariance intersection algorithm, etc.; classical algorithms, etc.). Examples of the perception module and/or model architectures are shown in FIG. 3 and FIG. 4.

The models can include classical or traditional algorithmic approaches, machine learning approaches, and/or be otherwise configured. The models can include regression (e.g., linear regression, non-linear regression, logistic regression, etc.), decision tree, LSA, clustering, association rules, dimensionality reduction (e.g., PCA, t-SNE, LDA, etc.), neural networks (e.g., CNN, SNN, DNN, CAN, LSTM, RNN, encoders, decoders, deep learning models, transformers, etc.), ensemble methods, optimization methods, classification, rules, heuristics, equations (e.g., weighted equations, etc.), selection (e.g., from a library), regularization methods (e.g., ridge regression), Bayesian methods (e.g., Naiive Bayes, Markov), instance-based methods (e.g., nearest neighbor), kernel methods, support vectors (e.g., SVM, SVC, etc.), statistical methods (e.g., probability), comparison methods (e.g., matching, distance metrics, thresholds, etc.), deterministics, genetic programs, filtering methods (e.g., particle filters, Kalman filters, EKF, etc.), covariance intersection methods, and/or any other suitable models, elements, and/or algorithmic elements. The models can include (e.g., be constructed using) a set of input layers, output layers, and hidden layers (e.g., connected in series, such as in a feed forward network; connected with a feedback loop between the output and the input, such as in a recurrent neural network; etc.; wherein the layer weights and/or connections can be learned through training); a set of connected convolution layers (e.g., in a CNN); a set of self-attention layers; and/or have any other suitable architecture.

Models can be trained, learned, fit, predetermined, and/or can be otherwise determined. The models can be trained or learned using: supervised learning, unsupervised learning, self-supervised learning, semi-supervised learning (e.g., positive-unlabeled learning), reinforcement learning, transfer learning, Bayesian optimization, fitting, interpolation and/or approximation (e.g., using gaussian processes), back-propagation, and/or otherwise generated. The models can be learned or trained on: labeled data (e.g., data labeled with the target label; auto-labeled training data, such as the context-specific training dataset), unlabeled data, positive training sets (e.g., a set of data with true positive labels), negative training sets (e.g., a set of data with true negative labels), and/or any other suitable set(s) of data.

Any model can optionally be validated, verified, reinforced, calibrated, or otherwise updated based on newly received, up-to-date measurements; past measurements recorded during the operating session; historic measurements recorded during past operating sessions; auto-labeled measurements; or be updated based on any other suitable data. For example, the model(s) and/or sub-elements thereof can be trained and/or updated using auto-labeled training dataset(s), heuristically labeled training datasets, manually labeled data, and/or using any other suitable data.

Any model can optionally be run or updated: once; at a predetermined frequency; every time the method is performed; every time an unanticipated measurement value is received; or at any other suitable frequency. Any model can optionally be run or updated: in response to determination of an actual result differing from an expected result; or at any other suitable frequency. Any model can optionally be run or updated concurrently with one or more other models, serially, at varying frequencies, or at any other suitable time.

The object detector (a.k.a., bowl detector) functions to detect bowls within the workspace of the conveyor. Additionally or alternatively, the object detector functions to execute Block S120. The object detector is preferably a 3D object detector which receives 3D representations from the imaging system as an input and generates a pose estimate as an output. Additionally or alternatively, the object detector can utilize 2D images (e.g., RGB), 2.5D images (e.g., RGB-depth images), greyscale images, point clouds, and/or any other suitable imaging data inputs. The object detector is preferably generalized/global to detect and/or generate pose estimates for bowls of arbitrary shapes/sizes (e.g., based on the object geometry). Additionally, the object detector preferably can output a segmented image region (e.g., bounding box) to be used for (comparative) bowl classification by a similarity model.

In variants, the object detector can be a neural network (NN) object detector which can include a convolutional neural network [CNN] based object detector (e.g., ResNET-18 backbone), cascade neural network, ensemble networks/methods, YOLO network, single shot multiBox detector (SSD), single-shot refinement neural network, and/or any other NN-based object detector. Additionally or alternatively, the object detector can be a non-neural network based object detector (e.g., feature and/or geometry based detector) and/or any other suitable object detector.

In variants, the object detector is preferably pretrained and/or predetermined (e.g., prior to execution of S100), but can additionally or alternatively be updated (e.g., via wireless updates from a remote or cloud processor, based on subsequent data collection, etc.) with any suitable frequency/timing. The object detector is preferably generalized (e.g., not specific to a particular assembly context, trained based on a variety of assembly contexts, etc.), but can be otherwise implemented.

Additionally, the set of models can include and/or operate in conjunction with the bowl detection and/or classification models as described in U.S. application Ser. No. 18/379,127, filed 11 Oct. 2023, which is incorporated herein in its entirety by this reference. However, the system can include or be used with any other suitable set of model(s).

Figure 10A:
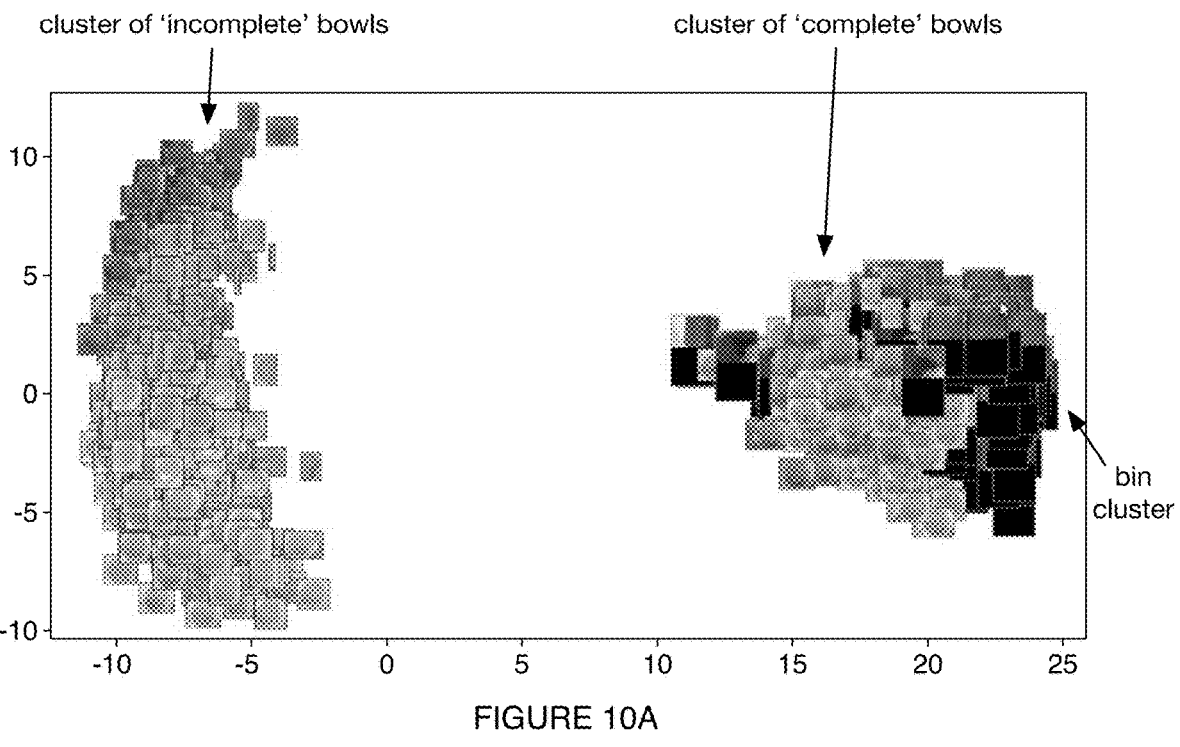
FIGS. 10A-10C are examples of clusters in a (reduced order) feature space of image embeddings generated by a similarity model in one or more variants of the method.
Figure 10B:
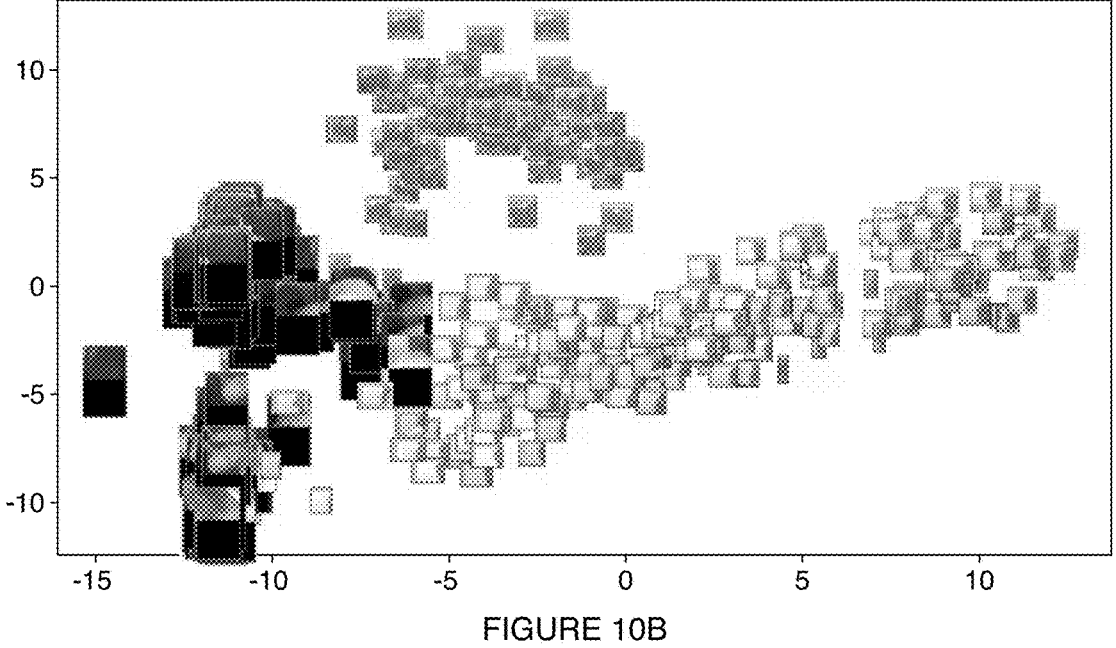
Figure 10C:
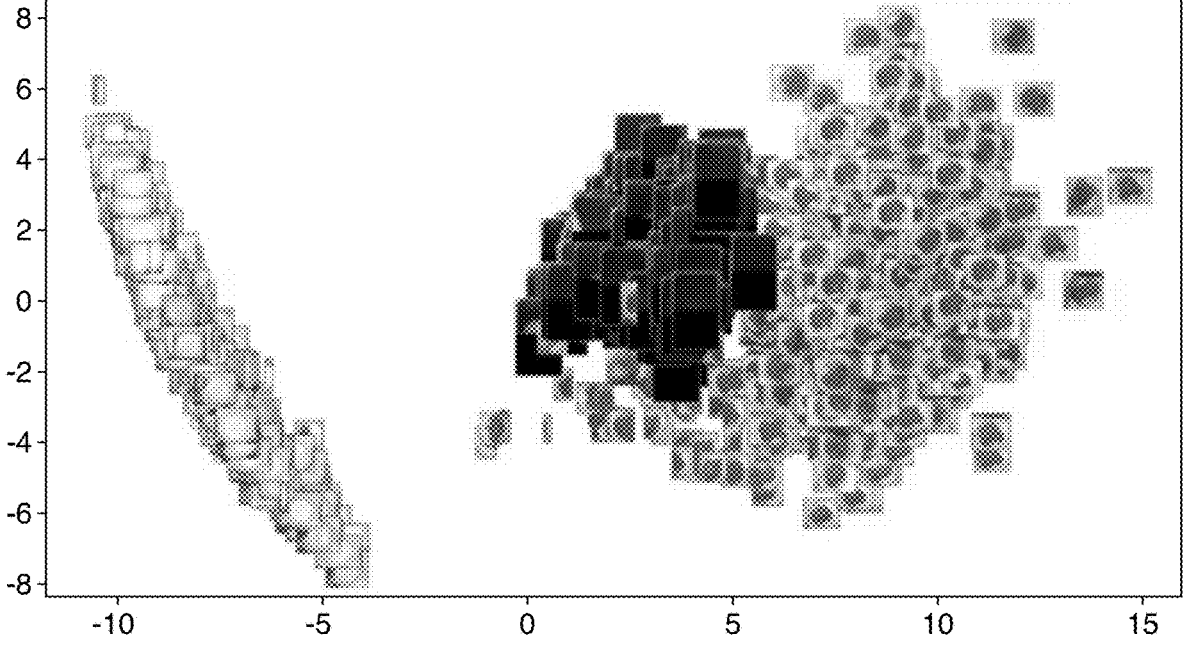

The similarity model (a.k.a., 'pan-bowl-similarity model [PBSM]) can include a Siamese neural network (SNN) model, which uses substantially identical subnetworks (i.e., two or more identical sub-networks, such as CNNs, having the same configuration with the same parameters and weights) to generate embeddings (e.g., extracted feature vectors) of the bin and container images. The feature vectors of these embeddings can be compared to generate a similarity score, or dissimilarity score, at a comparison layer(s) of the SNN. The similarity (and/or dissimilarity) score(s) can be used to determine a (binary) classification for each container (e.g., with heuristics, Non-max suppression, etc.) and/or (binary) classification probability by comparing the bin images and container images to check for the presence of the target foodstuffs (e.g., within the bin) in each container. High similarity (and/or low dissimilarity) can be associated with a 'complete' bowl state; Low similarity (and/or high dissimilarity) can be associated with an 'incomplete' bowl state. Additionally or alternatively, the image embeddings generated by the SSN can be compared in a cluster space representation of the feature vectors (e.g., of both the foodstuff bins and previously classified/labelled containers; such as for a rolling window of recent data frames; examples are shown in FIGS. 10A-C) to score classifications relative to neighbors. For example, a k-nearest neighbor evaluation in cluster space may be used to cross-check classifications (e.g., based on distance in feature space) and/or determine a classification probability. As an example, in some cases both 'incomplete' bowls and 'complete' bowls may have relatively close similarity scores, but may yield distinct clusters in feature space (e.g., an example is shown in FIG. 10B), which may be used to differentiate between them (e.g., based on the prior classifications/clusters). As a second example, where 'incomplete' and 'complete' feature vectors do not yield distinct clusters in feature space, the cluster representation may determine a low confidence score or classification probability and separate classification techniques, which may yield higher classification confidence/probability, can be relied upon (e.g., an example is shown in FIG. 4).

The similarity model and/or SNN thereof is preferably (pre-) trained (e.g., by error backpropagation to minimize cross entropy loss of the similarity/dissimilarity scores) using images from a variety of assembly line SKUs, ingredients, container geometries, and/or any other suitable set(s) of training data. As an example, the SNN and/or similarity model can be trained on a generalized training data set (e.g., hundreds of different ingredients) and used for generalized (non-ingredient specific) comparative classification of container states.

However, the similarity model can be otherwise configured.

The perception module can include a context-specific classifier which functions to classify containers (and/or a binary container state) relative to a machine context. For example, the machine context can be predetermined, received via an HMI, automatically received from an external system (e.g., cloud system, upstream robotic assembly module, assembly module communicatively connected via a local/wireless network, etc.), and/or otherwise determined. The context-specific classifier can classify containers based on a predetermined set of rules/heuristics, specified for a machine context. As an example, containers can be classified based on conveyor coloring/patterns (e.g., colored stripes; with each container in a particular stripe receiving a predetermined classification based on the context; 4 modules in series could each target a respective stripe color[s], with the belt configured with any suitable number/width of stripes). As a second example, containers can be classified based on row alignment and/or lateral arrangement (e.g., each container within a particular row may be labelled with a predetermined classification; where rows may be fully or partially offset along the conveyor width; based on relative displacement along the width of the conveyor). For instance, the system can filter out (such as by labelling with a 'complete' classification or otherwise) containers in a predetermined row, lane, and/or arrangement (e.g., within a colored stripe; offset by at least a predetermined threshold in Y along conveyor width; one predetermined row of bowls can be targeted for a multi-row conveyor line, etc.), which are not specified as targets for the machine context. However, the perception module can additionally or alternatively include any other suitable context-specific classifier and/or operate without a context-specific classifier (e.g., infer context from historical patterns, such as with a pattern-based classification model, and/or a prior data).

In variants, the perception module can optionally include a coordinated tracking module which functions to determine a classification(s) based on a priori object tracks (e.g., including a classification), such as from an upstream system of the conveyor line. For example, the coordinated tracking module can use a SLAM algorithm and/or other techniques to map the object detections in a current frame (and/or identified object tracks within the current frame) to prior object detections/tracks received from an upstream system to determine classifications for each object/bowl (e.g., based on upstream classifications and/or insertions). For instance, an a priori classification of a container which is completed/filled by an upstream system along the conveyor line can be used to classify the container at the (downstream) system where the container is identified and mapped into the current image frame with perception data from both systems (e.g., comparison of detections to map of a priori tracks from an upstream system, such as using Bayes filtering algorithms, Kalman filters, optimization-based mapping, such as graph-based SLAM or PTAM; using perception data and/or derived object detections; etc.). However, the perception module can additionally or alternatively include any other suitable coordinated tracking module and/or operate without a coordinated tracking module (e.g., where each assembly system/module is fully independent and/or operates without cross-communication, etc.).

For example, object detections can be mapped/indexed against a priori object data/tracks from an upstream module, such as indexing bowls using the bowl count and/or position (e.g., in direction of motion) as a reference. Additionally or alternatively, a priori data can be used to index against any suitable set of derived references (e.g., bowl pose parameters, spacing of bowls, lateral position of bowls, ingredient height, bounding boxes, bowl rotation, bowl vertical position, bowl orientation, etc.).

As a second example, the trajectory of indexed and classified a priori bowl detections (and/or belt features) can be mapped into a coordinate frame of a (downstream)

module based on a calibrated or inferred spacing between modules along the belt, which can be used to classify detected containers at the (downstream) module.

Coordinated modules can communicate: container counts (e.g., counts can be compared and reset in the case of drift; monitoring the speed of the tracks can allow for the timing/distance offset between the modules); perceived gap between bowls (e.g., indexed bowls and/or gaps; gaps can be used as a reference points both to compare counts and/or for module spacing; a large difference in the spacing may indicate the bowls were disrupted and may trigger a reset in the count or reliance on a separate classification approach); derived information about the bowl (e.g., which may add additional reference points, such as y position, rotation angle, etc.); module spacing (e.g., directly calibrated via a routine that sends one bowl down the line before running; inferred/calculated online based on coordinated mapping/tracking; etc.); relative position/order (e.g., predetermined; received via a user input at an HMI; derived based on SLAM or other method of cross-coordination which minimizes error between bowl position and a priori upstream tracks); and/or any other suitable data.

As an example, the HMI at one module can pair and/or coordinate the module relative to one or more proximal modules along a conveyor line, such as by manually providing the module order relative to the conveyor line and enabling cross-communications of the paired modules. Additionally or alternatively, the order can be automatically determined/derived for paired modules, and/or can be otherwise determined; and/or cross-coordination of modules can be otherwise enabled (e.g., centralized computing system; master-slave or lead-following of HMIs and/or computing systems, etc.).

For example, upon pairing (and/or communicatively coupling) two modules in a leading and/or following arrangement via the HMI, the downstream 'following' module can calibrate an offset distance between first and second robot workspaces based on a relative spacing between the plurality of containers. For example, the offset distance is determined by Simultaneous Localization and Mapping (SLAM) along the conveyor (e.g., wherein the offset distance is less than twice the dimension of the first robot workspace along the length of the conveyor line). Alternatively, the distance can be manually provided, estimated using secondary sensors, and/or can be otherwise determined. Additionally or alternatively, the offset distance can be updated periodically recalibrated and/or updated responsive to tracking errors, SLAM deviations, and/or any other suitable events/determinations.

However, the system can include any other suitable computing modules and/or altogether exclude one or more computing modules in some configurations/implementations (e.g., training, runtime, etc.)

However, the system can include any other suitable components.

4. Method

The method S100, an example of which is shown in FIG. 2, can include: determining image data S110; identifying a container using an object detector S120; and classifying a container state S130. The method can optionally include performing an action based on the container state classification S140. However, the method S100 can additionally or alternatively include any other suitable elements. The method functions to detect and classify the state of bowls (i.e., complete/incomplete) to facilitate ingredient insertion into (unserved, 'incomplete') bowls along an assembly line. Additionally or alternatively, the method can function to facilitate operation in conjunction with the any of the systems and/or method elements as described in U.S. application Ser. No. 17/881,475,filed 4 Aug. 2022, titled "SYSTEM AND/OR METHOD FOR ROBOTIC FOODSTUFF ASSEMBLY", U.S. application Ser. No. 18/075,961, filed 6 Dec. 2022, titled "SYSTEM AND/OR METHOD OF COOPERATIVE DYNAMIC INSERTION SCHEDULING OF INDEPENDENT AGENTS," U.S. application Ser. No. 18/379,127, filed 11 Oct. 2023,titled, "OBJECT CLASSIFICATION SYSTEM AND/OR METHODS," and/or U.S. application Ser. No. 18/499,092, filed 31 Oct, 2023, titled "SYSTEM AND/OR METHOD FOR CONVEYOR MOTION ESTIMATION," each of which is incorporated herein in its entirety by this reference.

The method and/or sub-elements thereof can be performed once, repeatedly, iteratively, periodically (e.g., with a specified update interval/frequency), aperiodically, continuously (e.g., over a discrete time interval, substantially continuously based on a data collection rate or frame rate, etc.), and/or with any other suitable timing. Sub-elements can occur sequentially/serially (e.g., for a single iteration of the method) and/or contemporaneously, simultaneously, and/or concurrently (e.g., across multiple iterations of the method and/or elements thereof), and/or with any other suitable timing or relationship.

Determining image data S110 functions to provide an input(s) to be used for object identification and/or classification. Image data is preferably generated and/or received periodically in accordance with a predetermined frame rate (e.g., less than 3 FPS, 3 FPS, 5 FPS, 10 FPS, 20 FPS, 30 FPS, greater than 30 FPS, any open or closed range bounded by the aforementioned values, etc.), and/or update frequency, but can alternatively be received with any other suitable timing/frequency. Image data is preferably sampled by and/or received from an imaging system, such as an imaging system mounted to a robotic assembly system, but can alternatively be received from a set of remote/external sensors and/or any suitable set of endpoint(s). For example, images can be received from a first set of cameras mounted above (and oriented towards) a conveyor workspace, and a second set of cameras mounted above (and oriented towards) a foodstuff bin(s). S110 can include: receiving bin images and receiving conveyor images. Bin images and conveyor images can be captured synchronously, asynchronously, contemporaneously (e.g., during robot operation on a particular set of foodstuff ingredients), and/or with any other suitable timing/relationship.

The image data preferably includes a first set of images of a conveyor transporting a set of bowls/containers (i.e., conveyor images) and a second set of images of a foodstuff bin (i.e., bin images) housing foodstuffs to be inserted into the containers. The conveyor images may segmented into individual container images (e.g., via Block S120) and compared against the bin images (e.g., via Block S130) to classify a container state (e.g., binary state; classified as 'complete' if the container has been served the target foodstuffs; 'incomplete' if the container has not been served the target foodstuffs).

Images are preferably captured by a plurality of cameras (e.g., 2, 4, etc.), but can alternatively be captured by a single camera (e.g., segmented regions within a single image), and/or can be otherwise captured. For example, the bin images can be segmented based on the pose/arrangement of the bin (e.g., predetermined, automatically detected/segmented, etc.; an example is shown in FIGURE). The image data can include: RGB images, depth images, 3D imaging data, point clouds, and/or any other suitable imaging data. Imaging data can optionally be pre-processed based on a sensor calibration (e.g., bundle adjusted based on sensor pose, cropped to remove image regions beyond conveyor workspace, etc.), converted into standardized coordinate frame (e.g., conveyor workspace of a robotic assembly module, etc.), transformed into a uniform pixel-to-distance image, and/or can be otherwise suitably pre-formatted or, alternatively, not be pre-formatted. In variants, S110 can be performed in-situ with a robotic foodstuff assembly module (e.g., registered pose/arrangement relative to a conveyor line and/or in a particular machine configuration). Additionally or alternatively, S110 can be performed by a separate/external system and/or using any other suitable imaging sensors/systems. However, imaging data can be otherwise suitably received and/or any other suitable sensor data can be used to facilitate other portions of the method.

For example, 2D, 2.5D, and/or 3D image data can be used for cross-coordination of modules and/or bowl tracking/classification.

However, images can be otherwise collected and/or can include or be associated with any other suitable data.

Identifying a container(s) using an object detector S120 functions to detect containers within the set of image data (e.g., from Block S110) to facilitate classification and/or ingredient insertion. Containers are preferably detected using a pretrained object detector, which detects unique object (container) instances from the imaging data, but can be otherwise suitably identified. Based on the identification(s), the conveyor imaging data can be segmented into an individual container image(s), for each container instance ID, to facilitate classification of the container state (e.g., via Block S130). As an example, a 3D object detector may output a pose estimate for each container, which can be used to segment a (separate) set of 2D image data. Alternatively, an object detector may receive 2D image data and output a bounding box and/or segmented image for each container instance. The object detector is preferably pretrained on a generalized set of training data (i.e., not specific to a single container geometry, ingredient type, conveyor line, etc.), but can alternatively be context-specific and/or can be otherwise implemented. As an example, the object detector can be one of the bowl detector (s) and/or object detectors as described in U.S. application Ser. No. 17/881,475, filed 4 Aug. 2022, U.S. application Ser. No. 18/075,961, filed 6 Dec. 2022, U.S. application Ser. No. 18/379,127, filed 11 Oct, 2023, and/or U.S. application Ser. No. 18/499,092, filed 31 Oct. 2023, each of which is incorporated herein in its entirety by this reference.

Bowls are preferably detected/identified from an individual image representation/frame of the imaging data received in S110, but can alternatively be generated with and/or tracked across multiple representations (e.g., a combination of point clouds and/or images captured within a single timestep, stereo-image, etc.), detected using point cloud data, and/or detected across multiple frames of imaging data (e.g., estimating object pose with an object tracker, where a portion of the frame may be occluded, etc.), and/or can be otherwise suitably detected. The bowls are preferably detected using the object detector (e.g., a generalized 3D object detector), but can be detected based on heuristic processes, depth image filtering, and/or any other suitable object detection techniques. In a specific example, bowls can be detected via one or more of the bowl detection processes as described in U.S. application Ser. No. 17/881,475, filed 4 Aug. 2022, which is incorporated herein in its entirety by this reference.

Bowl detection in S120 is preferably performed based on the image data sampled from S110 as an input, and can be performed synchronously, contemporaneously, and/or asynchronously (e.g., subsequently) with image data sampling. In variants, bowl detection may be performed based on a first subset of data (e.g., 3D point cloud) to facilitate classification using a second subset of data (e.g., segmented 2D RGB images).

The object detector can determine a container pose estimate in a sensor coordinate frame (and/or robot coordinate frame) based on the input images. The container pose estimate can be a 2D pose estimate, 2.5D pose estimate (e.g., under an assumption of planarity), 3D pose estimate, and/or any other suitable pose estimate. The pose estimate can include: a bounding box (e.g., defined from max/min positions for a set of orthogonal axes; axis aligned, not axis aligned, etc.), corner points, primary container axis, central point (e.g., center point of a circular bowl, centroid, etc.), a set of identified key points (e.g., corner point, center point of a circular bowl, centroid, etc.), and/or any other suitable pose estimate. The container pose estimate is preferably determined as an object pose estimate output of the object detector, but can be otherwise suitably determined (e.g., bounding box; image segment/region; etc.).

S120 preferably includes segmenting a container image(s) based on the pose estimate (and/or object detection/identification). For example, the conveyor image(s) can be segmented to separately identify each container for individual classification via S130. In variants, S120 can determine a single segmented container image based on the detected container pose and/or a plurality of segmented container images.

However, containers can be otherwise suitably detected/identified in Block S120.

Classifying a container state S130 functions to determine a (binary) state of the detected container(s). More preferably, S130 classifies each container state based on a comparison of the (segmented) container image with the bin image(s) using the similarity model (e.g., SNN comparison and/or cluster space comparison). The similarity model can compare the segmented container image to a single (e.g., current) bin image and/or a time history (e.g., rolling, short-term history; last 10 frames, last 15 seconds of consecutive frames, etc.). As an example, rolling comparison windows may be less sensitive to edge/corner cases (e.g., in the current frame, such as an occlusion caused by a robot arm; foodstuff refill event; larger data volume; etc.) and/or variations over longer time horizons (e.g., foodstuff ingredients regularly vary between batches, shifts, SKUs; substantially similar lighting conditions may exist for images within a short time window; etc.). Additionally or alternatively, container states can be classified by tracking coordination between modules (e.g., based on a priori object tracks), context-specific classification techniques (e.g., container position relative to the conveyor and/or features thereof; lane-based container classification), pattern-based classification techniques (e.g., inferred context patterns based on historical data and/or derived features, etc.), and/or can be otherwise classified.

4.1 PBSM

The similarity model preferably extracts features (i.e., a feature vector) with a sub-network (SNN) to determine an embedding for each image. The feature vectors can be compared (e.g., taking the vector distance) at a set of comparison layers to determine a similarity score (a.k.a., 'done' or 'complete' score), a dissimilarity score (a.k.a., 'incomplete' or 'empty' score), and/or any other suitable scores/outputs. Additionally, the embeddings (feature vector) generated by the SNN can be returned as an output, such as to allow segmented container images to be compared and/or otherwise evaluated/scored relative to clusters of image embeddings (in feature space).

In one set of variants, the similarity model can additionally score/evaluate the embeddings in a feature space by cluster comparison against prior embeddings (e.g., last 15 seconds of classifications, etc.; examples are shown in FIGS. 10A-10C), such as using nearest neighbor methods (e.g., k-nearest neighbor algorithm, k-NN density estimation, etc.), Support Vector Machines (SVM), regression, and/or any other suitable cluster evaluation models/techniques. For example, a k-NN methods can be used to cross-check classifications determined by the similarity model against prior classifications and/or pre-labeled classifications (e.g., segmented images of a tracked bowl[s] sampled after insertion of foodstuffs, where the container state is known to be 'complete'; etc.).

The scores determined by the similarity model can be filtered and/or post-processed can refine/suppress outputs with any one or more of: a cost function optimization algorithm (or energy maximization algorithm), non-max suppression (NMS) algorithm, predetermined rules, heuristics, decision trees, probabilistic graphical models, probability distributions, dynamic programs, ML models and/or other models/techniques. The similarity model can include or be used with a decision layer which returns a single (binary) classification and/or score/probability for each container image detection. For instance, the similarity model can optionally include a Non-Max Suppression (NMS) post-processor (e.g., as an element of a decision layer), which outputs a single classification score for each container detection (segmented image).

4.2 Coordination

Container states can be classified in S130 based on inter-module communication (e.g., based on a priori object tracks) with a coordinated tracking module. For example, object detections can be mapped/indexed against a priori object data/tracks from an upstream module, such as indexing bowls using the bowl count and/or position (e.g., in direction of motion) as a reference. Additionally or alternatively, a priori data can be used to index against any suitable set of derived references (e.g., spacing of bowls, lateral position/orientation of bowls, ingredient height, bounding boxes, etc.). As a second example, the trajectory of indexed and classified a priori bowl detections (and/or belt features) can be mapped into a coordinate frame of a (downstream, following) module based on a calibrated or inferred spacing distance between modules along the belt, which can be used to classify detected containers at the (downstream) module. As a third example, a priori tracks can be communicated between modules and used to index and classify individual bowls relative to a common (external) coordinate frame using extrinsic references (e.g., belt with graduated markings, indices, fiducials, stripes, etc.). As an example, belt fiducials such as April tags, barcodes, QR codes, and/or any other suitable fiducials can be used to set a common external reference frame via extrinsic/external references (i.e., not defined intrinsically by the module[s]).

Coordinated modules can communicate (and/or receive): container counts (e.g., counts can be compared and reset in the case of drift; monitoring the speed of the tracks can allow for the timing/distance offset between the modules); perceived gap between bowls (e.g., indexed bowls and/or gaps; gaps can be used as a reference points both to compare counts and/or for module spacing; a large difference in the spacing may indicate the bowls were disrupted and may trigger a reset in the count or reliance on a separate classification approach); derived information about the bowl (e.g., which may add additional reference points, such as y position, rotation angle, etc.); module spacing (e.g., directly calibrated via a routine that sends one bowl down the line before running; inferred/calculated online with coordinated mapping; etc.); relative position/order (e.g., predetermined; received via a user input at an HMI; derived based on SLAM or other method of mapping/coordination); conveyor texture/features (e.g., conveyor index features, etc.); and/or any other suitable inter-module communications/data.

The coordinated tracking module can determine classifications by classical techniques, heuristics approaches, model-based (e.g., ML) approaches, and/or any other suitable techniques. Coordinated tracking classifications can be used in conjunction with outputs from the similarity model or other classification approaches (e.g., fused at a decision layer, scores/probabilities evaluated with NMS, etc.), and/or used independently to determine container classifications in S130. An example is shown in FIG. 4.

4.3 Classification Decisions

Figure 7B:
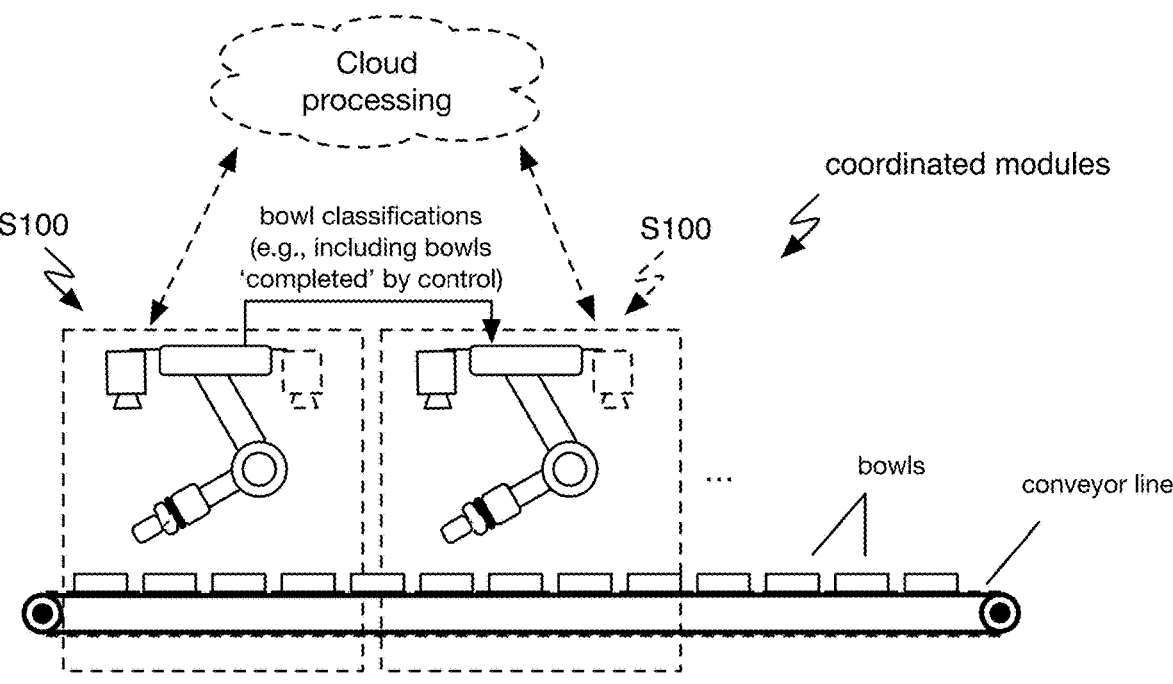
Figure 9:
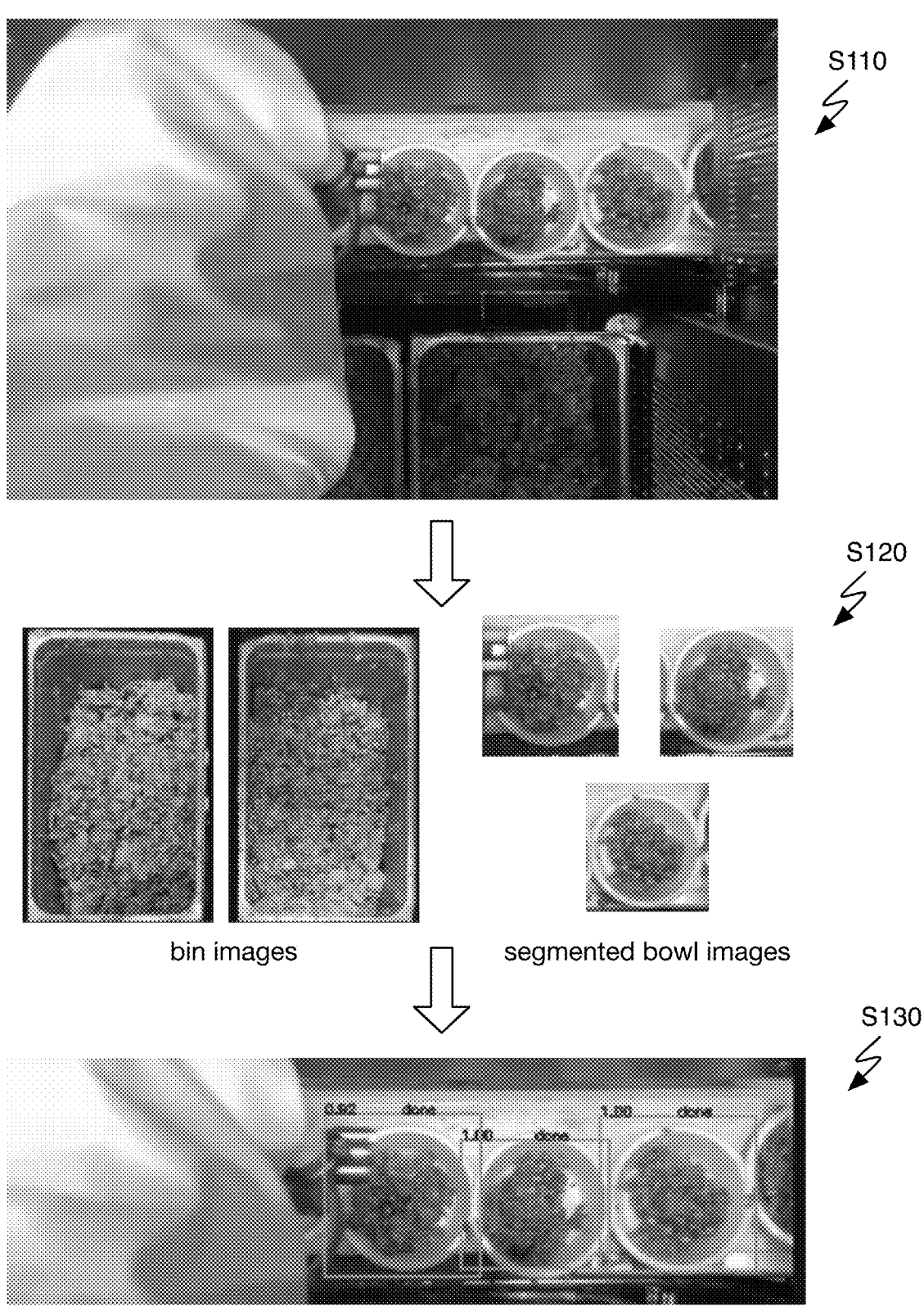
FIG. 9 is an illustrative example of imaging data transformation in a variant of the method.

In variants, S130 can optionally classify the container state based on multiple models and/or classification approaches with a decision layer. A decision layer can determine the container classification using the outputs of the similarity model and/or classifications from one or more of: a context-specific classifier (e.g., facilitating classification based on context-specific factors such as conveyor appearance, bowl poses relative to the conveyor, etc.), a pattern-based classification model (e.g., current, historical, and/or external classifications can be used to infer assembly patterns, which can be used to classify individual containers), a coordinated tracking module (e.g., coordinating classification with a priori data and/or object tracks from an external object tracker, such as an upstream system; an example is shown in FIG. 7B), and/or any other suitable models/elements. For example, a pattern-based classification model may score detections based on historical patterns in tracked/labeled containers (e.g., where alternating containers have been completed upstream; based on container orientation; etc.). As a second example, a context-specific classifier can score detections based on a specific assembly context/configuration, such as based on a detected bowl orientation (e.g., where the robot can be configured to target all containers with a particular orientation), conveyor appearance (e.g., target containers within a stripe of a particular color; container texture), container geometry/shape, container arrangement relative to the belt (e.g., where containers spacing or relative arrangement about the belt axis may direct insertion).

However, container states can be otherwise suitably classified.

Optionally performing an action based on the container state classification S140 preferably functions to facilitate robot operation and/or foodstuff insertion based on the container state (i.e., targeting bowls of the 'incomplete' state). As an example, S140 can include controlling a robot to insert foodstuffs from the bin into a detected container classified with an 'incomplete' state. S140 can include: selecting a container for ingredient insertion (e.g., based on the classified container state), controlling the robot based on the selected container, and/or any other suitable elements.

In variants, S140 can include: selecting a container, classified with an incomplete state, for ingredient insertion; automatically determining (e.g., at a controller) a set of control instructions for the foodstuff assembly robot based on the target; and executing the set of control instructions at the foodstuff assembly robot to insert the foodstuff ingredient. As an example, S140 can include controlling a foodstuff assembly robot as described in U.S. application Ser. No. 17/881,484, filed 4 Aug. 2022,which is incorporated herein in its entirety by this reference.

Additionally or alternatively, S140 can include dynamic insertion scheduling as described in 18/075,961, filed 6 Dec. 2022, which is incorporated herein in its entirety by this reference.

However, the method can include any other suitable elements.

5 Variants

Figure 11:
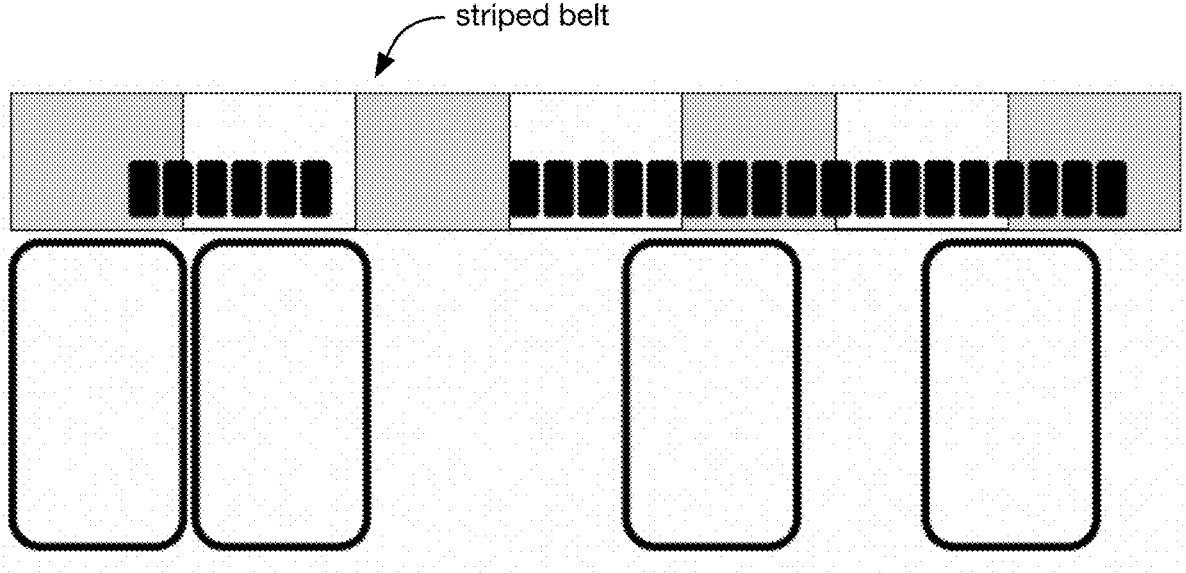
FIG. 11 is an example schematic illustration of a striped belt in a variant of the system and/or method.

In some variants, multi-colored conveyors can be used as a reference, which can encode contextual information to facilitate module coordination. For example, this could include a code for the entire belt or colored stripes (e.g., that are roughly the width of the module, such as about 1 meter; an example is shown in FIG. 11). A first module could then simply reference bowl position relative to a stripe interface (e.g., 10 cm in blue stripe) and a classification (e.g., bowl served or not served; semantic, binary, etc.). A second module could then identify the bowls based on location (e.g., with some tolerance for detection area, such as +/−2 cm) and serve bowls not yet classified as served. The second module could also be responsible for checking the positions match roughly with what was sent by the first module. If the positions do not match, an error can be triggered (e.g., may not serve until they match again; this would preference missed bowls over double placements).

In some variants, bowl count and/or position can be used as a reference, which may have a couple of advantages. First, it may not require retrofitting and can work with any customer conveyor. Second, it can take advantage of reliable vision data: whether a bowl is detected/present or not. In variants, each module can count the number of bowls coming by and may then be set up to serve even or odd bowls (or 3rd, 4th, 5th etc. for more modules per ingredient). Cross communication can help us recover from edge cases where a bowl count is missed, or where a person inserts/removes a bowl, which would otherwise cause drift in the count (and cause all future places to be wrong). Some additional operations can be performed when the modules are communicating: in variants, the modules can compare counts, and if they drift reset them (e.g., this may require monitoring the speed of the tracks to allow for the time offset between the modules); Modules can share the perceived gap between bowls and use these as reference points both to compare counts and for module spacing (additionally, a big difference in the spacing could indicate the bowls were messed with and trigger a reset in the count); Variants can use other information about the bowl to add additional reference points, its y position, it's angle etc.; Variants can calculate module spacing with a calibration routine that sends one bowl down the line before running (e.g., this could even calculate module position, so the position would may not need to be selected at the HMI). This could be scaled to any number of modules serving the same ingredient. The modules can keep their own counts, which can advantageously reduce the latency and reliability requirements of the module-to-module connection.

In variants, module-to-module communication can use onsite WiFi AP separate from the modules, mesh network radio, hardwired connection, and/or any other type(s) of communication. As an example, the cross-communications can be networked (e.g., modules interconnected and/or forming a local network), direct (e.g., wired or wireless), indirect (e.g., linked via a central server/hub), cloud-based (e.g., with each module linked via cloud communications), and/or modules can otherwise coordinated via any suitable communicative coupling(s)/network(s).

In variants, modules serving the same ingredient can be linked automatically, manually (e.g., hardwire connection, manual selection/input via HMI, etc.; separate module setup, collective/multi-module setup, etc.), and/or can be otherwise coordinated and communicatively coupled.

Alternative embodiments implement the above methods and/or processing modules in non-transitory computer-readable media, storing computer-readable instructions. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-transitory computer readable media, or any suitable device. The computer-executable component can include a computing system and/or processing system (e.g., including one or more collocated or distributed, remote or local processors) connected to the non-transitory computer-readable medium, such as CPUs, GPUs, TPUS, microprocessors, or ASICs, but the instructions can alternatively or additionally be executed by any suitable dedicated hardware device.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A method for pairwise control of a first foodstuff assembly robot and a second foodstuff assembly robot along a conveyor line, the method comprising:

based on a first image of a first robot workspace of the first foodstuff assembly robot, determining a plurality of container tracks for a plurality of containers within the first robot workspace;

based on the plurality of container tracks, controlling the first foodstuff assembly robot to perform a first foodstuff insertion operation into a first subset of the plurality of containers;

subsequently, based on a second image of a second robot workspace of the second foodstuff assembly robot, identifying a remainder of the plurality of containers within the second robot workspace, wherein the first robot workspace and the second robot workspace are non-overlapping, wherein the remainder of the plurality of containers are identified based on a relative spacing between the plurality of containers along the conveyor, wherein the relative spacing comprises an arrangement of the plurality of containers; and controlling the second foodstuff assembly robot to perform a second foodstuff insertion operation into the remainder of the plurality of containers.

2. The method of claim 1, wherein the remainder of the plurality of containers are identified based on the plurality of container tracks.

3. The method of claim 2, wherein the remainder of the plurality of containers are identified by a computing system of the second foodstuff assembly robot, wherein the method further comprises: prior to capturing the second image, receiving the plurality of tracks at the computing system of the second foodstuff assembly robot.

4. The method of claim 3, wherein the first and second foodstuff assembly robots are communicatively coupled via a wireless mesh network.

5. The method of claim 1, further comprising, at the second foodstuff assembly robot:

classifying each container of the plurality of containers based on the foodstuff insertion performed by the first foodstuff assembly robot, wherein the remainder of the plurality of containers is identified based on the respective classification of each container; and tracking the remainder of the plurality of containers within the second robot workspace.

6. The method of claim 5, wherein each container is classified using an extrinsic reference.

7. The method of claim 6, wherein the extrinsic reference is a set of indicators along the conveyor line.

8. The method of claim 5, wherein each container is classified using an intrinsic reference associated with the container, wherein the intrinsic reference is independent of foodstuff within the container.

9. The method of claim 5, wherein each container is classified using an image comparison.

10. The method of claim 5, further comprising: at the first foodstuff assembly robot, estimating a speed of the conveyor line, wherein the first subset of the plurality of containers are selected according to a first predetermined insertion strategy based on the speed of the conveyor line.

11. The method of claim 10, wherein the second foodstuff assembly robot is controlled to perform foodstuff insertion into the remainder of the plurality of containers according to a second predetermined insertion strategy, wherein the second predetermined insertion strategy is different from the first predetermined insertion strategy.

12. The method of claim 1, wherein the first subset of the plurality of containers are selected according to a first predetermined insertion strategy, wherein a speed of the conveyor line is controlled based on the first predetermined insertion strategy.

13. The method of claim 1, further comprising: at the second foodstuff assembly robot, calibrating an offset distance between first and second robot workspaces based on a relative spacing between the plurality of containers.

14. The method of claim 13, wherein the offset distance is determined by Simultaneous Localization and Mapping (SLAM) of container motion along the conveyor relative to the second robot workspace.

15. The method of claim 13, wherein the offset distance is calibrated responsive to a manual pairing of the first and second foodstuff assembly robots.

16. The method of claim 13, wherein the offset distance is less than twice the dimension of the first robot workspace along the length of the conveyor line.

17. The method of claim 1, further comprising: dynamically controlling the conveyor line based on the foodstuff insertion performed at the first foodstuff assembly robot.

18. The method of claim 1, wherein the first foodstuff assembly robot is controlled in a pairwise arrangement based on a third foodstuff assembly robot.

19. The method of claim 1, wherein identifying a remainder of the plurality of containers within the second robot workspace comprises dynamically identifying the remainder of the plurality of containers based on the second image.

20. The method of claim 1, wherein the first foodstuff insertion operation and second foodstuff insertion operation both insert identical foodstuff ingredients.

21. A method for pairwise control of a first and a second robot along a conveyor line, the method comprising:

based on a first image of a first workspace of the first robot, determining a plurality of container tracks for a plurality of containers within the first robot workspace;

based on the plurality of container tracks, controlling the first robot to perform a first foodstuff insertion operation into a first subset of the plurality of containers;

subsequently, based on a second image of a second robot workspace of the second robot, identifying a remainder of the plurality of containers within the second robot workspace based on a relative spacing between the plurality of containers along the conveyor line; and controlling the second robot to perform a second foodstuff insertion operation into the remainder of the plurality of containers, wherein the first foodstuff insertion operation and the second foodstuff insertion operation each comprise inserting a same type of foodstuffs.

22. The method of claim 21, wherein the remainder of the plurality of containers are identified based on the plurality of container tracks by Simultaneous Localization and Mapping (SLAM) of container motion on the conveyor line relative to the second robot workspace.

* * * * *